United States Patent
Willcut

(10) Patent No.: US 11,989,851 B2
(45) Date of Patent: May 21, 2024

(54) DEFORMABLE IMAGE REGISTRATION USING DEEP LEARNING

(71) Applicant: Elekta, Inc., Atlanta, GA (US)

(72) Inventor: Virgil Matthew Willcut, Kirkwood, MO (US)

(73) Assignee: Elekta, Inc., Atlanta, GA (US)

( * ) Notice: Subject to any disclaimer, the term of this patent is extended or adjusted under 35 U.S.C. 154(b) by 479 days.

(21) Appl. No.: 17/303,007

(22) Filed: May 18, 2021

(65) Prior Publication Data

US 2022/0245757 A1 Aug. 4, 2022

Related U.S. Application Data

(60) Provisional application No. 63/199,947, filed on Feb. 4, 2021.

(51) Int. Cl.
*G06T 3/00* (2006.01)
*G06N 20/00* (2019.01)
(Continued)

(52) U.S. Cl.
CPC .............. *G06T 3/14* (2024.01); *G06N 20/00* (2019.01); *G06T 7/0012* (2013.01);
(Continued)

(58) Field of Classification Search
CPC .................. G06T 3/0068; G06T 7/0012; G06T 2207/10081; G06T 2207/10088;
(Continued)

(56) References Cited

U.S. PATENT DOCUMENTS 7,933,380 B2    4/2011    Nord et al.
8,184,886 B2    5/2012    Khamene et al.
(Continued)

FOREIGN PATENT DOCUMENTS

WO    2022169525    8/2022

OTHER PUBLICATIONS

Fu, Yabo, "Deformable MR-CBCT prostate registration using biomechanically constrained deep learning networks", Miedical Physics., vol. 48, No. 1, Retrieved from the Internet: URL: https: onlinelibrary.wiley.com doi full-xml 10.1002 mp.14584,(Jan. 1, 2021), 253-263 (Year: 2021).*

(Continued)

*Primary Examiner* — Van D Huynh
(74) *Attorney, Agent, or Firm* — Schwegman Lundberg & Woessner, P.A.

(57) ABSTRACT

Systems and methods are disclosed for performing operations comprising: receiving first and second images depicting an anatomy of a subject; applying a trained machine learning model to a first data set associated with the first image and a second data set associated with the second image to estimate a biomechanically accurate DVF representing a mapping of pixels or voxels from the first image to the second image, the machine learning model trained to establish a relationship between a plurality of pairs of data sets associated with images of a patient anatomy and respective biomechanically accurate DVF representations of pixel or voxel mapping between the plurality of pairs of data sets; applying the estimated biomechanically accurate DVF to deform a dose from a previous treatment session.

25 Claims, 14 Drawing Sheets

(51) Int. Cl.
  *G06T 3/14*  (2024.01)
  *G06T 7/00*  (2017.01)
(52) U.S. Cl.
  CPC ............... *G06T 2207/10081* (2013.01); *G06T 2207/10088* (2013.01); *G06T 2207/10132* (2013.01); *G06T 2207/20081* (2013.01); *G06T 2207/20084* (2013.01); *G06T 2207/30016* (2013.01)
(58) Field of Classification Search
  CPC . G06T 2207/10132; G06T 2207/20081; G06T 2207/20084; G06T 2207/30016; G06T 2207/10072; G06T 2207/10116; G06T 7/33; G06N 20/00
  See application file for complete search history.

(56) References Cited

U.S. PATENT DOCUMENTS

| | | | | |
|---|---|---|---|---|
| 2015/0305650 | A1* | 10/2015 | Hunter | A61B 10/04 600/424 |
| 2018/0221566 | A1* | 8/2018 | Ohnmacht | A61B 6/481 |
| 2018/0314906 | A1* | 11/2018 | Yang | G06V 10/462 |
| 2019/0329072 | A1* | 10/2019 | Magro | G01T 1/161 |
| 2023/0342882 | A1* | 10/2023 | Hiasa | G06T 3/18 |

OTHER PUBLICATIONS

Chen, Liyun, "Semantic Hierarchy Guided Registration Networks for Intra-subject Pulmonary CT Image Alignment", Advances in Intelligent Data Analysis XIX; [Lecture Notes in Computer Science; Lect.Notes Computer], Section 2.1, subsection "Label Alignment Network", (Oct. 4, 2020), 181-189 (Year: 2020).*

"International Application Serial No. PCT US2021 070573, International Search Report dated Sep. 10, 2021", 4 pgs.

"International Application Serial No. PCT US2021 070573, Written Opinion dated Sep. 10, 2021", 7 pgs.

Chen, Liyun, "Semantic Hierarchy Guided Registration Networks for Intra-subject Pulmonary CT Image Alignment", Advances in Intelligent Data Analysis XIX; [Lecture Notes in Computer Science; Lect.Notes Computer], Section 2.1, subsection "Label Alignment Network", (Oct. 4, 2020), 181-189.

Fu, Yabo, "Deformable MR-CBCT prostate registration using biomechanically constrained deep learning networks", Medical Physics., vol. 48, No. 1, Retrieved from the Internet:URL:https: onlinelibrary.wiley.com doi full-xml 10.1002 mp.14584, (Jan. 1, 2021), 253-263.

"Morfeus Laboratory", University of Texas MD Anderson Cancer Center, [Online] Retrieved from the Internet: < URL: https://www.mdanderson.org/research/departments-labs-institutes/labs/morfeus-laboratory.html>, (Retrieved on Dec. 18, 2020), 2 pgs.

Cazoulat, Guillaume, et al., "Biomechanical Deformable Image Registration of Longitudinal Lung CT Images Using Vessel Information", Phys Med Biol, 61(13), (Jul. 7, 2016), 4826-4839.

Horie, M., "The Role of Biomechanical Anatomical Modeling via Computed Tomography for identification of Restrictive Allograft Syndrome", Clinical Transplantation, 31(8), e13027, (2017).

Phellan, Renzo, et al., "Real-time biomechanics using the finite element method and machine learning: Review and perspective", Medical Physics 48(1), (2020), pp. 7-18.

Velec, Michael, et al., "Validation of biomechanical deformable image registration in the abdomen, thorax, and pelvis in a commercial radiotherapy treatment planning system", Med. Phys. 44 (7), (Jul. 2017), 3407-3417.

"International Application Serial No. PCT US2021 070573, International Preliminary Report on Patentability dated Aug. 17, 2023", 9 pgs.

* cited by examiner

DEFORMABLE IMAGE REGISTRATION USING DEEP LEARNING

CROSS-REFERENCE TO RELATED APPLICATION

This application claims the benefit of priority to U.S. Provisional Application No. 63/199,947, filed Feb. 4, 2021, which is incorporated by reference in its entirety herein.

TECHNICAL FIELD

Embodiments of the present disclosure pertain generally to deformable image registration (DIR).

BACKGROUND

Radiation therapy (or "radiotherapy") can be used to treat cancers or other ailments in mammalian (e.g., human and animal) tissue. One such radiotherapy technique involves irradiation with a Gamma Knife, whereby a patient is irradiated by a large number of low-intensity gamma ray beams that converge with high intensity and high precision at a target (e.g., a tumor). In another embodiment, radiotherapy is provided using a linear accelerator, whereby a tumor is irradiated by high-energy particles (e.g., electrons, protons, ions, high-energy photons, and the like). The placement and dose of the radiation beam must be accurately controlled to ensure the tumor receives the prescribed radiation, and the placement of the beam should be such as to minimize damage to the surrounding healthy tissue, often called the organ(s) at risk (OARs). Radiation is termed "prescribed" because a physician orders a predefined amount of radiation to the tumor and surrounding organs similar to a prescription for medicine. Generally, ionizing radiation in the form of a collimated beam is directed from an external radiation source toward a patient.

A specified or selectable beam energy can be used, such as for delivering a diagnostic energy level range or a therapeutic energy level range. Modulation of a radiation beam can be provided by one or more attenuators or collimators (e.g., a multi-leaf collimator (MLC)). The intensity and shape of the radiation beam can be adjusted by collimation to avoid damaging healthy tissue (e.g., OARs) adjacent to the targeted tissue by conforming the projected beam to a profile of the targeted tissue.

The treatment planning procedure may include using a three-dimensional (3D) image of the patient to identify a target region (e.g., the tumor) and to identify critical organs near the tumor. Creation of a treatment plan can be a time-consuming process where a planner tries to comply with various treatment objectives or constraints (e.g., dose volume histogram (DVH), overlap volume histogram (OVH)), taking into account their individual importance (e.g., weighting) in order to produce a treatment plan that is clinically acceptable. This task can be a time-consuming trial-and-error process that is complicated by the various OARs because as the number of OARs increases (e.g., up to thirteen for a head-and-neck treatment), so does the complexity of the process. OARs distant from a tumor may be easily spared from radiation, while OARs close to or overlapping a target tumor may be difficult to spare.

Traditionally, for each patient, the initial treatment plan can be generated in an "offline" manner. The treatment plan can be developed well before radiation therapy is delivered, such as using one or more medical imaging techniques. Imaging information can include, for example, images from X-rays, computed tomography (CT), nuclear magnetic resonance (MR), positron emission tomography (PET), single-photon emission computed tomography (SPECT), or ultrasound. A health care provider, such as a physician, may use 3D imaging information indicative of the patient anatomy to identify one or more target tumors along with the OARs near the tumor(s). The health care provider can delineate the target tumor that is to receive a prescribed radiation dose using a manual technique, and the health care provider can similarly delineate nearby tissue, such as organs, at risk of damage from the radiation treatment. Alternatively, or additionally, an automated tool (e.g., ABAS provided by Elekta AB, Sweden) can be used to assist in identifying or delineating the target tumor and organs at risk. A radiation therapy treatment plan ("treatment plan") can then be created using an optimization technique based on clinical and dosimetric objectives and constraints (e.g., the maximum, minimum, and fraction of dose of radiation to a fraction of the tumor volume ("95% of target shall receive no less than 100% of prescribed dose"), and like measures for the critical organs). The optimized plan is comprised of numerical parameters that specify the direction, cross-sectional shape, and intensity of each radiation beam.

The treatment plan can then be later executed by positioning the patient in the treatment machine and delivering the prescribed radiation therapy directed by the optimized plan parameters. The radiation therapy treatment plan can include dose "fractioning," whereby a sequence of radiation treatments is provided over a predetermined period of time (e.g., 30-45 daily fractions), with each treatment including a specified fraction of a total prescribed dose. However, during treatment, the position of the patient and the position of the target tumor in relation to the treatment machine (e.g., linear accelerator—"linac") is very important in order to ensure the target tumor and not healthy tissue is irradiated.

Since most patients receive more than 1 fraction of radiation as part of a course of therapy, and because the anatomy may change (deform) between these fractions it is not straightforward to sum the doses delivered during the individual fractions so the physician can accurately gauge how the treatment is proceeding relative to the original intent as defined by the prescription. To solve this problem, deformable image registration (DIR) may be used to obtain a deformation vector field (DVF) that describes the pixel or voxel mapping between any two image sets. These DVFs may be used to deform the dose between any of the image sets of the same patient, therefore allowing all of the fractional doses to be summed (accumulated) on any one image set. This allows the physician to assess how the treatment is proceeding more accurately and, therefore, adapt the treatment as needed so the course of radiotherapy remains consistent with the original physician intent or informs the physician's desire to change the intent based on this new information.

Overview

In some embodiments, a method is provided for generating a biomechanically accurate deformation vector field (DVF) for input images. The method includes receiving first and second images depicting an anatomy of a subject; applying a trained machine learning model to a first data set associated with the first image and a second data set associated with the second image to estimate a biomechanically accurate DVF representing a mapping of pixels or voxels from the first image to the second image, the machine learning model trained to establish a relationship between a plurality of pairs of data sets associated with images of a patient anatomy and respective biomechanically accurate DVF representations of pixel or voxel mapping between the plurality of pairs of data sets; and applying the estimated biomechanically accurate DVF to deform a dose from a previous treatment session.

In some implementations, the machine learning model comprises a deep convolution neural network.

In some implementations, the method includes training the machine learning model by adjusting one or more parameters of the machine learning model to minimize a cost function that includes a difference between a given one of the biomechanically accurate DVF representations and predicted biomechanically accurate DVF representations generated based on respective pairs of the plurality of pairs of images.

In some implementations, the first data set associated with the first image includes a fixed image and the second data set associated with the second image includes a moving image.

In some implementations, the first data set comprises at least one of one or more portions of the first image of the anatomy or a first set of contours derived from the first image of the anatomy, and wherein the second data set comprises at least one of one or more portions of the second image or a second set of contours derived from the second image.

In some implementations, the method includes applying the trained machine learning model to the first set of contours and the second set of contours to estimate the DVF representing a mapping of pixels or voxels from the first image to the second image, the machine learning model being trained to establish a relationship between a plurality of sets of contours and respective biomechanically accurate DVF representations of pixel or voxel mapping between the sets of contours.

In some implementations, the method includes: segmenting the first image to generate the first set of data comprising a first set of contours; segmenting the second image to generate the second set of data comprising a second set of contours; and applying the trained machine learning model to the first image, the first set of contours, the second image and the second set of contours to estimate a biomechanically accurate DVF representing a mapping of pixels or voxels from the first image to the second image, the machine learning model being trained to establish a relationship between a plurality of pairs of images of a patient anatomy with corresponding sets of contours and respective biomechanically accurate DVF representations of pixel or voxel mapping between the plurality of pairs of images and corresponding sets of contours.

In some implementations, the biomechanically accurate DVF maintains biomechanical properties of tissues depicted in the first and second images.

In some implementations, the first image comprises a computed tomography (CT) image, a synthetic CT image, a magnetic resonance (MR) image, a synthetic MR image, an ultrasound image, or a synthetic ultrasound image, and wherein the second images comprises an MR image.

In some implementations, the method includes generating a set of training data comprising the biomechanically accurate DVF representations of pixel or voxel mapping between the plurality of pairs of data sets associated with the images, the generating of the set of training data comprising: receiving a first pair of data sets associated with the images of the plurality of pairs of data sets associated with the images; and applying a biomechanical deformable image registration (BDIR) technique to the first pair of data sets to generate a first biomechanically accurate DVF representation.

In some implementations, the method includes training the machine learning model by: obtaining the first pair of data sets and the first biomechanically accurate DVF representation; applying the machine learning model to the first pair of data sets to generate a first estimated biomechanically accurate DVF representation; computing a deviation between the first estimated biomechanically accurate DVF representation and the first biomechanically accurate DVF representation; and adjusting one or more parameters of the machine learning model based on the computed deviation.

In some embodiments, a method of training a machine leaning model to estimate a biomechanically accurate deformation vector field (DVF) representation is provided. The method includes: obtaining a first data set associated with a first pair of images of a patient anatomy; obtaining a ground-truth biomechanically accurate DVF representation for the first data set associated with the first pair of images; applying a machine learning model to the first data set to generate a first estimated biomechanically accurate DVF representation; computing a deviation between the first estimated biomechanically accurate DVF representation and the ground-truth biomechanically accurate DVF representation for the first data set; and adjusting one or more parameters of the machine learning model based on the computed deviation.

In some implementations, the method includes: obtaining a plurality of pairs of data sets associated with images of the patient anatomy; obtaining a plurality of ground-truth biomechanically accurate DVF representations associated with respective ones of the plurality of pairs of data sets associated with the images; and for each of the plurality of pairs of data sets: applying the machine learning model to the respective pair of data sets to generate a respective estimated biomechanically accurate DVF representation; computing a deviation between the respective estimated biomechanically accurate DVF representation and the ground-truth biomechanically accurate DVF representation associated with the respective one of the pair of data sets; and adjusting one or more parameters of the machine learning model based on the computed deviation.

In some implementations, the method includes: receiving the first data set associated with the first pair of images of the patient anatomy; and applying a biomechanical deformable image registration (BDIR) technique to the first data set to generate the ground-truth biomechanically accurate DVF representation for the first data set.

In some embodiments, a system is provided that includes one or more processors for performing operations including: receiving first and second data sets associated respectively with first and second images depicting an anatomy of a subject; applying a trained machine learning model to the first data set associated with the first image and the second data set associated with the second image to estimate a biomechanically accurate DVF representing a mapping of pixels or voxels from the first data set to the second data set, the machine learning model being trained to establish a relationship between a plurality of pairs of data sets associated with images of a patient anatomy and respective DVF representations of pixel or voxel mapping between the plurality of pairs of data sets; and applying the estimated biomechanically accurate DVF to deform a dose from a previous treatment session.

In some implementations, the machine learning model comprises a deep convolution neural network.

In some implementations, the operations further comprise training the machine learning model by adjusting one or more parameters of the machine learning model to minimize a cost function that includes a difference between a given one of the biomechanically accurate DVF representations and predicted biomechanically accurate DVF representations generated based on respective pairs of the plurality of pairs of data sets.

In some implementations, the first data set associated with the first image includes a fixed image and the second data set associated with the second image includes a moving image.

In some implementations, the first data set comprises at least one of one or more portions of the first image of the anatomy or a first set of contours derived from the first image of the anatomy, and wherein the second data set comprises at least one of one or more portions of the second image or a second set of contours derived from the second image.

In some implementations, the operations include applying the trained machine learning model to the first set of contours and the second set of contours to estimate the DVF representing a mapping of pixels or voxels from the first image to the second image, the machine learning model being trained to establish a relationship between a plurality of sets of contours and respective biomechanically accurate DVF representations of pixel or voxel mapping between the sets of contours.

In some implementations, the operations further comprise: segmenting the first image to generate the first set of data comprising a first set of contours; segmenting the second image to generate the second set of data comprising a second set of contours; and applying the trained machine learning model to the first image, the first set of contours, the second image and the second set of contours to estimate a biomechanically accurate DVF representing a mapping of pixels or voxels from the first image to the second image, the machine learning model being trained to establish a relationship between a plurality of pairs of data sets associated with images of a patient anatomy with corresponding sets of contours and respective biomechanically accurate DVF representations of pixel or voxel mapping between the plurality of pairs of data sets and corresponding sets of contours.

In some implementations, the operations further comprise: generating a set of training data comprising the biomechanically accurate DVF representations of pixel or voxel mapping between the plurality of pairs of data sets associated with the images, the generating of the set of training data comprising: receiving a first pair of data sets of the plurality of pairs of data sets; and applying a biomechanical deformable image registration (BDIR) technique to the first pair of data sets to generate a first biomechanically accurate DVF representation.

In some implementations, the operations further comprise training the machine learning model by: obtaining the first pair of data sets and the first biomechanically accurate DVF representation; applying the machine learning model to the first pair of data sets to generate a first estimated biomechanically accurate DVF representation; computing a deviation between the first estimated biomechanically accurate DVF representation and the first biomechanically accurate DVF representation; and adjusting one or more parameters of the machine learning model based on the computed deviation.

In some embodiments, a non-transitory machine-readable storage medium is provided that includes instructions that, when executed by one or more processors of a machine, cause the machine to perform operations comprising: receiving first and second data sets associated respectively with first and second images depicting an anatomy of a subject; applying a trained machine learning model to the first data set associated with the first image and the second data set associated with the second image to estimate a biomechanically accurate DVF representing a mapping of pixels or voxels from the first data set to the second data set, the machine learning model being trained to establish a relationship between a plurality of pairs of data sets associated with images of a patient anatomy and respective DVF representations of pixel or voxel mapping between the plurality of pairs of data sets; and applying the estimated biomechanically accurate DVF to deform a dose from a previous treatment session.

In some embodiments, a non-transitory machine-readable storage medium is provided that includes instructions that, when executed by one or more processors of a machine, cause the machine to perform operations comprising: obtaining a first data set associated with a first pair of images of a patient anatomy; obtaining a ground-truth biomechanically accurate DVF representation for the first data set associated with the first pair of images; applying a machine learning model to the first data set to generate a first estimated biomechanically accurate DVF representation; computing a deviation between the first estimated biomechanically accurate DVF representation and the ground-truth biomechanically accurate DVF representation for the first data set; and adjusting one or more parameters of the machine learning model based on the computed deviation.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example but not by way of limitation, various embodiments discussed in the present document.

DETAILED DESCRIPTION

Figure 1:
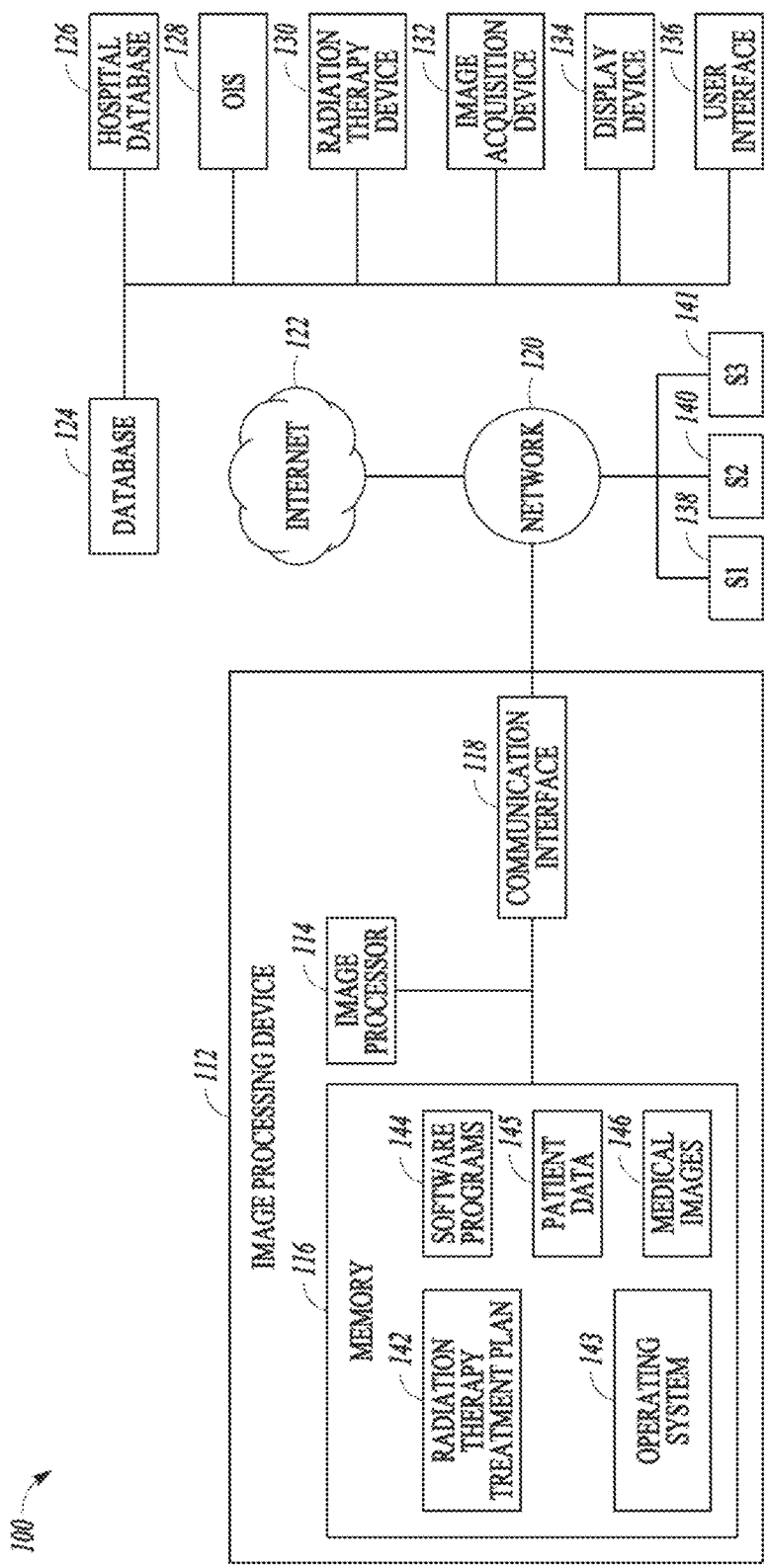
FIG. 1 illustrates an exemplary radiotherapy system, according to some embodiments of the present disclosure.

In the following detailed description, reference is made to the accompanying drawings which form a part hereof, and which is shown by way of illustration-specific embodiments in which the present disclosure may be practiced. These embodiments, which are also referred to herein as "examples," are described in sufficient detail to enable those skilled in the art to practice the disclosure, and it is to be understood that the embodiments may be combined, or that other embodiments may be utilized and that structural, logical and electrical changes may be made without departing from the scope of the present disclosure. The following detailed description is, therefore, not be taken in a limiting sense, and the scope of the present disclosure is defined by the appended claims and their equivalents.

Deformable Registration (DR) is the process by which the mapping of pixels (in the case of 2D images) or voxels (in the case of a 3D image volume) from one image set to another is determined. The transformation that defines this mapping is termed a Deformation Vector Field (DVF). DIR algorithms are a special class of DR algorithms that determine the DVF using the image content and take as input a fixed image (the one to be warped or the reference image) and a moving image (the target image to which the fixed image will be morphed). The pixels/voxels are allowed to rotate, translate and deform. These algorithms then generate a DVF representing the mapping of the pixels/voxels from the fixed image to the moving image or vice versa. This class of algorithms, although they may be regularized or have some constraints imposed by the designer of the algorithm, do not explicitly model the properties of human tissues and, therefore, the DVFs produced by such algorithms may be biomechanically incorrect.

A more accurate class of algorithms are those deformable registration algorithms that may or may not rely on image content, but directly model the tissue properties. Such algorithms are given as input the surfaces of the volumes (or polygon(s) in the 2D case) as a fixed surface and a moving surface and then they provide a solution that respects the biomechanical properties of the tissues. These are referred to as Biomechanical Deformable Image Registration (BDIR) techniques. While such techniques generate accurate DVFs that take into account tissue properties, they typically do not produce results quickly enough to be applied in real-time or near real-time scenarios. They also require a known segmentation of the surface or polygon in the moving image which further limits their practical applicability.

This present disclosure provides a deep learning (DL) technique that produces a biomechanically accurate DVF from a pair of input images and/or pairs of surfaces, that define volumes with known biomechanical properties, defined by either manually or automatically performed segmentation on these images. As referred to herein an "accurate DVF" or "biomechanically accurate DVF" is a DVF that maps pixels or voxels from one image to another taking into account biomechanical properties of tissues depicted in images. The DL can be trained on BDIR produced DVFs in one embodiment. Specifically, the present disclosure includes various techniques to improve and enhance radiotherapy treatment by predicting or estimating a biomechanically accurate DVF that represents (maintains) a mapping of pixels/voxels from a fixed image to a moving image or vice versa. The use of a DL to predict the biomechanically accurate DVF enables the fast and accurate generation of the biomechanically accurate DVF which makes the disclosed system applicable in real-time or near real-time scenarios and applications. The technical benefits include reduced radiotherapy treatment plan creation time and may result in many apparent medical treatment benefits (including improved accuracy of radiotherapy treatment, reduced exposure to unintended radiation, and the like). The disclosed techniques may be applicable to a variety of medical treatment and diagnostic settings or radiotherapy treatment equipment and devices.

According to some embodiments, the disclosed systems and methods receive first and second images depicting an anatomy of a subject and applying a trained machine learning model to a first data set associated with the first image and a second data set associated with the second image to estimate a biomechanically accurate DVF representing a mapping of pixels or voxels from the first image to the second image. The machine learning model may be trained to establish a relationship between a plurality of pairs of data sets associated with images of a patient anatomy and respective biomechanically accurate DVF representations of pixel or voxel mapping between the plurality of pairs of data sets. The disclosed embodiments apply the estimated biomechanically accurate DVF to deform a dose from a previous treatment session. In some embodiments, the first and second data sets can include only the first and second images themselves. In some embodiments, the first and second data sets can include only contour sets associated with the first and second images. In some embodiments, the first and second data sets can include the first and second images themselves and contour sets associated with the first and second images.

In some embodiments, the disclosed machine learning model can generate a biomechanically accurate DVF from input images that include contours or input images that do not include contours. For example, a first machine learning model is disclosed that can receive a pair of input images with respective contours (e.g., segmented images) and generates or predicts a biomechanically accurate DVF for the pair of input images. In such cases, the machine learning model is trained based on training images that include respective sets of contours along with the associated ground truth biomechanically accurate DVFs of the training images. As another example, a second machine learning model is disclosed that can receive a pair of input images without respective contours and generates or predicts a biomechanically accurate DVF for the pair of input images. In such cases, the machine learning model is trained based on training images along with the associated ground truth biomechanically accurate DVFs of the training images. As another example, a third machine learning model is disclosed that can receive a pair of sets of contours for each image set of a patient anatomy and generates or predicts a biomechanically accurate DVF for the pair of contour sets of the images. In such cases, the machine learning model is trained based on training data that includes sets of contour pairs along with the associated ground truth biomechanically accurate DVFs of the training data.

According to some embodiments, a training data set is generated for training a machine learning model. The training data set is generated by receiving a first pair of images and/or contours of the plurality of pairs of images and applying a BDIR technique to the first pair of images and/or contour sets of the first pair of images to generate a first biomechanically accurate DVF representation. Such a process is repeated for each pair of images in a set of images and/or contour sets associates with each pair of images to generate the respective biomechanically accurate DVF representation for each pair of images and/or contour sets. The training data set is then used to train the machine learning model.

FIG. 1 illustrates an exemplary radiotherapy system 100 for providing radiation therapy to a patient. The radiotherapy system 100 includes an image processing device 112. The image processing device 112 may be connected to a network 120. The network 120 may be connected to the Internet 122. The network 120 can connect the image processing device 112 with one or more of a database 124, a hospital database 126, an oncology information system (OIS) 128, a radiation therapy device 130, an image acquisition device 132, a display device 134, and a user interface 136. The image processing device 112 can be configured to generate radiation therapy treatment plans 142 to be used by the radiation therapy device 130.

The image processing device 112 may include a memory device 116, a processor 114, and a communication interface 118. The memory device 116 may store computer-executable instructions, such as an operating system 143, radiation therapy treatment plans 142 (e.g., original treatment plans, adapted treatment plans and the like), software programs 144 (e.g., artificial intelligence, deep learning, neural networks, radiotherapy treatment plan software), and any other computer-executable instructions to be executed by the processor 114.

In one embodiment, the software programs 144 may convert medical images of one format (e.g., MRI) to another format (e.g., CT) by producing synthetic images, such as pseudo-CT images, pseudo-MR images, or pseudo-ultrasound images. For instance, the software programs 144 may include image processing programs to train a predictive model for converting a medical image 146 in one modality (e.g., an MRI image) into a synthetic image of a different modality (e.g., a pseudo CT image, pseudo-MR images, or pseudo-ultrasound images); alternatively, the trained predictive model may convert a CT image into an MRI image. In another embodiment, the software programs 144 may register the patient image (e.g., a CT image or an MR image) with that patient's dose distribution (also represented as an image) so that corresponding image voxels and dose voxels are associated appropriately by the network. In yet another embodiment, the software programs 144 may substitute functions of the patient images such as signed distance functions or processed versions of the images that emphasize some aspect of the image information. Such functions might emphasize edges or differences in voxel textures, or any other structural aspect useful to neural network learning. In another embodiment, the software programs 144 may substitute functions of the dose distribution that emphasize some aspect of the dose information. Such functions might emphasize steep gradients around the target or any other structural aspect useful to neural network learning. The memory device 116 may store data, including medical images 146, patient data 145, and other data required to create and implement a radiation therapy treatment plan 142.

In yet another embodiment, the software programs 144 may generate a biomechanically accurate DVF representing a transformation or mapping of pixels or voxels between a set or pair of two-dimensional (2D) and/or 3D images (e.g., CT or MR images) depicting an anatomy (e.g., one or more targets and one or more OARs). For example, the software programs 144 may process the set of images (and/or data associated with or derived from the set of images) and apply a trained machine learning model to the set of images (and/or data associated with or derived from the set of images) to create or estimate a biomechanically accurate DVF for the images (and/or data associated with or derived from the set of images). Based on the biomechanically accurate DVF of the images, a dose from a previous treatment session can be deformed or modified. Namely, by determining the accurate mapping of pixels/voxels from one image to another, a determination can be made as to the amount of dose delivered to a particular target depicted in the images and/or the amount of movement of the target between the times at which the images were taken. Based on the amount of delivered dose and/or movement of the target, the dose can be deformed.

In some cases, the software programs 144 may generate a biomechanically accurate DVF by processing images of the target alone using the trained machine learning model. In such cases, the machine learning model can receive a pair of input images without respective contours and generates or predicts a biomechanically accurate DVF for the pair of input images. The machine learning model is trained based on training data that includes training images that do not include respective sets of contours along with the associated ground truth biomechanically accurate DVFs of the training images.

In some cases, the software programs 144 may generate a biomechanically accurate DVF by processing images of the target together with their respective contours (generated by segmenting the images) using the trained machine learning model. Specifically, the machine learning model can receive a pair of input images with respective sets of contours and generates or predicts a biomechanically accurate DVF for the pair of input images and their sets of contours. In such cases, the machine learning model is trained based on training data that includes training images and their respective sets of contours along with the associated ground truth biomechanically accurate DVFs of the training images.

In some cases, the software programs 144 may generate a biomechanically accurate DVF by processing sets of contours of images alone (generated by segmenting the images) using the trained machine learning model. Specifically, the machine learning model can receive a pair of contour sets for each of the images (e.g., the pair can include a collection of one or more contours derived from one image and another collection of one or more contours derived from another image) of a patient anatomy. The machine learning model generates or predicts a biomechanically accurate DVF for the pair of contour sets of these images. In such cases, the machine learning model is trained based on training data that includes pairs of contour sets (e.g., one or more contours of a first training image and one or more contours of a second training image) along with the associated ground truth biomechanically accurate DVFs of the pairs of contour sets.

The software programs 144 can generate a training data set for training a machine learning model to predict or estimate a biomechanically accurate DVF. The training data set is generated by receiving a first pair of images of a plurality of pairs of images (and/or contour sets associated with the pairs of images) and applying a BDIR technique to the first pair of images (and/or contour sets associated with the pairs of images) to generate a first biomechanically accurate DVF (ground-truth biomechanically accurate DVF) representation for the first pair of images (and/or contour sets associated with the pairs of images). Such a process is repeated for each pair of images in a set of images (and/or contour sets associated with the pairs of images) to generate the respective biomechanically accurate DVF representation for each pair of images (and/or contour sets associated with the pairs of images). The training data set is then used to train the machine learning model by inputting the same pairs of images (and/or contour sets associated with the pairs of images) along with the generated ground-truth biomechanically accurate DVF representations of the images. A loss function is computed based on a difference or deviation between an estimated biomechanically accurate DVF representation and the generated ground-truth biomechanically accurate DVF representation. The loss function is used to update parameters of the machine learning model.

In addition to the memory device 116 storing the software programs 144, it is contemplated that software programs 144 may be stored on a removable computer medium, such as a hard drive, a computer disk, a CD-ROM, a DVD, a HD, a Blu-Ray DVD, USB flash drive, a SD card, a memory stick, or any other suitable medium; and the software programs 144 when downloaded to image processing device 112 may be executed by image processor 114.

The processor 114 may be communicatively coupled to the memory device 116 and the processor 114 may be configured to execute computer executable instructions stored thereon. The processor 114 may send or receive medical images 146 to memory device 116. For example, the processor 114 may receive medical images 146 from the image acquisition device 132 via the communication interface 118 and network 120 to be stored in memory device 116. The processor 114 may also send medical images 146 stored in memory device 116 via the communication interface 118 to the network 120 be either stored in database 124 or the hospital database 126.

Further, the processor 114 may utilize software programs 144 (e.g., a treatment planning software) along with the medical images 146 and patient data 145 to create the radiation therapy treatment plan 142. Medical images 146 may include information such as imaging data associated with (or derived from) a patient anatomical region, organ, or volume of interest segmentation data. Patient data 145 may include information such as (1) functional organ modeling data (e.g., serial versus parallel organs, appropriate dose response models, etc.); (2) radiation dosage data (e.g., DVH information; or (3) other clinical information about the patient and course of treatment (e.g., other surgeries, chemotherapy, previous radiotherapy, etc.).

In addition, the processor 114 may utilize software programs to generate intermediate data such as updated parameters to be used, for example, by a machine learning model, such as a neural network model; or generate intermediate 2D or 3D images, which may then subsequently be stored in memory device 116. The processor 114 may subsequently then transmit the executable radiation therapy treatment plan 142 via the communication interface 118 to the network 120 to the radiation therapy device 130, where the radiation therapy plan will be used to treat a patient with radiation. In addition, the processor 114 may execute software programs 144 to implement functions such as image conversion, image segmentation, deep learning, neural networks, and artificial intelligence. For instance, the processor 114 may execute software programs 144 that train or contour a medical image; such software programs 144 when executed may train a boundary detector or utilize a shape dictionary.

The processor 114 may be a processing device, include one or more general-purpose processing devices such as a microprocessor, a central processing unit (CPU), a graphics processing unit (GPU), an accelerated processing unit (APU), or the like. More particularly, the processor 114 may be a complex instruction set computing (CISC) microprocessor, a reduced instruction set computing (RISC) microprocessor, a very long instruction Word (VLIW) microprocessor, a processor implementing other instruction sets, or processors implementing a combination of instruction sets. The processor 114 may also be implemented by one or more special-purpose processing devices such as an application specific integrated circuit (ASIC), a field programmable gate array (FPGA), a digital signal processor (DSP), a System on a Chip (SoC), or the like. As would be appreciated by those skilled in the art, in some embodiments, the processor 114 may be a special-purpose processor, rather than a general-purpose processor. The processor 114 may include one or more known processing devices, such as a microprocessor from the Pentium™, Core™, Xeon™, or Itanium® family manufactured by Intel™, the Turion™, Athlon™, Sempron™, Opteron™, FX™, Phenom™ family manufactured by AMD™, or any of various processors manufactured by Sun Microsystems. The processor 114 may also include graphical processing units such as a GPU from the GeForce®, Quadro®, Tesla® family manufactured by Nvidia™, GMA, Iris™ family manufactured by Intel™, or the Radeon™ family manufactured by AMD™. The processor 114 may also include accelerated processing units such as the Xeon Phi™ family manufactured by Intel™. The disclosed embodiments are not limited to any type of processor(s) otherwise configured to meet the computing demands of identifying, analyzing, maintaining, generating, and/or providing large amounts of data or manipulating such data to perform the methods disclosed herein. In addition, the term "processor" may include more than one processor (for example, a multi-core design or a plurality of processors each having a multi-core design). The processor 114 can execute sequences of computer program instructions, stored in memory device 116, to perform various operations, processes, methods that will be explained in greater detail below.

The memory device 116 can store medical images 146. In some embodiments, the medical images 146 may include one or more MRI images (e.g., 2D MRI, 3D MRI, 2D streaming MRI, four-dimensional (4D) MRI, 4D volumetric MRI, 4D cine MRI, etc.), functional MRI images (e.g., fMRI, DCE-MRI, diffusion MRI, synthetic MRI images), CT images (e.g., 2D CT, cone beam CT, 3D CT, 4D CT), ultrasound images (e.g., 2D ultrasound, 3D ultrasound, 4D ultrasound, synthetic ultrasound), one or more projection images representing views of an anatomy depicted in the MRI, synthetic CT (pseudo-CT), and/or CT images at different angles of a gantry relative to a patient axis, PET images, X-ray images, fluoroscopic images, radiotherapy portal images, SPECT images, computer generated synthetic images (e.g., pseudo-CT images), aperture images, graphical aperture image representations of MLC leaf positions at different gantry angles, and the like. Further, the medical images 146 may also include medical image data, for instance, training images, and ground truth images, contoured images, and dose images. In an embodiment, the medical images 146 may be received from the image acquisition device 132. Accordingly, image acquisition device 132 may include an MRI imaging device, a CT imaging device, a PET imaging device, an ultrasound imaging device, a fluoroscopic device, a SPECT imaging device, an integrated linac and MRI imaging device, or other medical imaging devices for obtaining the medical images of the patient. The medical images 146 may be received and stored in any type of data or any type of format that the image processing device 112 may use to perform operations consistent with the disclosed embodiments.

The memory device 116 may be a non-transitory computer-readable medium, such as a read-only memory (ROM), a phase-change random access memory (PRAM), a static random access memory (SRAM), a flash memory, a random access memory (RAM), a dynamic random access memory (DRAM) such as synchronous DRAM (SDRAM), an electrically erasable programmable read-only memory (EEPROM), a static memory (e.g., flash memory, flash disk, static random access memory) as well as other types of random access memories, a cache, a register, a CD-ROM, a DVD or other optical storage, a cassette tape, other magnetic storage device, or any other non-transitory medium that may be used to store information including image, data, or computer executable instructions (e.g., stored in any format) capable of being accessed by the processor 114, or any other type of computer device. The computer program instructions can be accessed by the processor 114, read from the ROM, or any other suitable memory location, and loaded into the RAM for execution by the processor 114. For example, the memory device 116 may store one or more software applications. Software applications stored in the memory device 116 may include, for example, an operating system 143 for common computer systems as well as for software-controlled devices. Further, the memory device 116 may store an entire software application, or only a part of a software application, that are executable by the processor 114. For example, the memory device 116 may store one or more radiation therapy treatment plans 142.

The image processing device 112 can communicate with the network 120 via the communication interface 118, which can be communicatively coupled to the processor 114 and the memory device 116. The communication interface 118 may provide communication connections between the image processing device 112 and radiotherapy system 100 components (e.g., permitting the exchange of data with external devices). For instance, the communication interface 118 may in some embodiments have appropriate interfacing circuitry to connect to the user interface 136, which may be a hardware keyboard, a keypad, or a touch screen through which a user may input information into radiotherapy system 100.

Communication interface 118 may include, for example, a network adaptor, a cable connector, a serial connector, a USB connector, a parallel connector, a high-speed data transmission adaptor (e.g., such as fiber, USB 3.0, thunderbolt, and the like), a wireless network adaptor (e.g., such as a WiFi adaptor), a telecommunication adaptor (e.g., 3G, 4G/LTE and the like), and the like. Communication interface 118 may include one or more digital and/or analog communication devices that permit image processing device 112 to communicate with other machines and devices, such as remotely located components, via the network 120.

The network 120 may provide the functionality of a local area network (LAN), a wireless network, a cloud computing environment (e.g., software as a service, platform as a service, infrastructure as a service, etc.), a client-server, a wide area network (WAN), and the like. For example, network 120 may be a LAN or a WAN that may include other systems S1 (138), S2 (140), and S3 (141). Systems S1, S2, and S3 may be identical to image processing device 112 or may be different systems. In some embodiments, one or more of systems in network 120 may form a distributed computing/simulation environment that collaboratively performs the embodiments described herein. In some embodiments, one or more systems S1, S2, and S3 may include a CT scanner that obtains CT images (e.g., medical images 146). In addition, network 120 may be connected to Internet 122 to communicate with servers and clients that reside remotely on the internet.

Therefore, network 120 can allow data transmission between the image processing device 112 and a number of various other systems and devices, such as the OIS 128, the radiation therapy device 130, and the image acquisition device 132. Further, data generated by the OIS 128 and/or the image acquisition device 132 may be stored in the memory device 116, the database 124, and/or the hospital database 126. The data may be transmitted/received via network 120, through communication interface 118 in order to be accessed by the processor 114, as required.

The image processing device 112 may communicate with database 124 through network 120 to send/receive a plurality of various types of data stored on database 124. For example, database 124 may include machine data (control points) that includes information associated with a radiation therapy device 130, image acquisition device 132, or other machines relevant to radiotherapy. Machine data information may include control points, such as radiation beam size, arc placement, beam on and off time duration, machine parameters, segments, MLC configuration, gantry speed, MRI pulse sequence, and the like. Database 124 may be a storage device and may be equipped with appropriate database administration software programs. One skilled in the art would appreciate that database 124 may include a plurality of devices located either in a central or a distributed manner.

In some embodiments, database 124 may include a processor-readable storage medium (not shown). While the processor-readable storage medium in an embodiment may be a single medium, the term "processor-readable storage medium" should be taken to include a single medium or multiple media (e.g., a centralized or distributed database, and/or associated caches and servers) that store the one or more sets of computer executable instructions or data. The term "processor-readable storage medium" shall also be taken to include any medium that is capable of storing or encoding a set of instructions for execution by a processor and that cause the processor to perform any one or more of the methodologies of the present disclosure. The term "processor readable storage medium" shall accordingly be taken to include, but not be limited to, solid-state memories, optical and magnetic media. For example, the processor readable storage medium can be one or more volatile, non-transitory, or non-volatile tangible computer-readable media.

Image processor 114 may communicate with database 124 to read images into memory device 116 or store images from memory device 116 to database 124. For example, the database 124 may be configured to store a plurality of images (e.g., 3D MRI, 4D MRI, 2D MRI slice images, CT images, 2D Fluoroscopy images, X-ray images, raw data from MR scans or CT scans. Digital Imaging and Communications in Medicine (DIMCOM) data, projection images, graphical aperture images, etc.) that the database 124 received from image acquisition device 132. Database 124 may store data to be used by the image processor 114 when executing software program 144, or when creating radiation therapy treatment plans 142. Database 124 may store the data produced by the trained machine leaning mode, such as a neural network including the network parameters constituting the model learned by the network and the resulting predicted data. The image processing device 112 may receive the imaging data, such as a medical image 146 (e.g., 2D MRI slice images, CT images, 2D Fluoroscopy images, X-ray images, 3D MRI images, 4D MRI images, projection images, graphical aperture images, image contours, etc.) either from the database 124, the radiation therapy device 130 (e.g., an MRI-linac), and or the image acquisition device 132 to generate a treatment plan 142.

In an embodiment, the radiotherapy system 100 can include an image acquisition device 132 that can acquire medical images (e.g., MRI images, 3D MRI, 2D streaming MRI, 4D volumetric MRI, CT images, cone-Beam CT, PET images, functional MRI images (e.g., fMRI, DCE-MRI and diffusion MRI), X-ray images, fluoroscopic image, ultrasound images, radiotherapy portal images, SPECT images, and the like) of the patient. Image acquisition device 132 may, for example, be an MRI imaging device, a CT imaging device, a PET imaging device, an ultrasound device, a fluoroscopic device, a SPECT imaging device, or any other suitable medical imaging device for obtaining one or more medical images of the patient. Images acquired by the image acquisition device 132 can be stored within database 124 as either imaging data and/or test data. By way of example, the images acquired by the image acquisition device 132 can be also stored by the image processing device 112, as medical image 146 in memory device 116.

In an embodiment, for example, the image acquisition device 132 may be integrated with the radiation therapy device 130 as a single apparatus (e.g., an MRI-linac). Such an MRI-linac can be used, for example, to determine a location of a target organ or a target tumor in the patient, so as to direct radiation therapy accurately according to the radiation therapy treatment plan 142 to a predetermined target.

The image acquisition device 132 can be configured to acquire one or more images of the patient's anatomy for a region of interest (e.g., a target organ, a target tumor, or both). Each image, typically a 2D image or slice, can include one or more parameters (e.g., a 2D slice thickness, an orientation, and a location, etc.). In an embodiment, the image acquisition device 132 can acquire a 2D slice in any orientation. For example, an orientation of the 2D slice can include a sagittal orientation, a coronal orientation, or an axial orientation. The processor 114 can adjust one or more parameters, such as the thickness and/or orientation of the 2D slice, to include the target organ and/or target tumor. In an embodiment, 2D slices can be determined from information such as a 3D MRI volume. Such 2D slices can be acquired by the image acquisition device 132 in "real-time" while a patient is undergoing radiation therapy treatment, for example, when using the radiation therapy device 130, with "real-time" meaning acquiring the data in at least milliseconds or less.

The image processing device 112 may generate and store radiation therapy treatment plans 142 for one or more patients. The radiation therapy treatment plans 142 may provide information about a particular radiation dose to be applied to each patient. The radiation therapy treatment plans 142 may also include other radiotherapy information, such as control points including beam angles, gantry angles, beam intensity, dose-histogram-volume information, the number of radiation beams to be used during therapy, the dose per beam, and the like.

The image processor 114 may generate the radiation therapy treatment plan 142 by using software programs 144 such as treatment planning software (such as Monaco®, manufactured by Elekta AB of Stockholm, Sweden). In order to generate the radiation therapy treatment plans 142, the image processor 114 may communicate with the image acquisition device 132 (e.g., a CT device, an MRI device, a PET device, an X-ray device, an ultrasound device, etc.) to access images of the patient and to delineate a target, such as a tumor to generate contours of the images. In some embodiments, the delineation of one or more OARs, such as healthy tissue surrounding the tumor or in close proximity to the tumor may be required. Therefore, segmentation of the OAR may be performed when the OAR is close to the target tumor. In addition, if the target tumor is close to the OAR (e.g., prostate in near proximity to the bladder and rectum), then by segmenting the OAR from the tumor, the radiotherapy system 100 may study the dose distribution not only in the target but also in the OAR.

In order to delineate a target organ or a target tumor from the OAR, medical images, such as MRI images, CT images, PET images, fMRI images, X-ray images, ultrasound images, radiotherapy portal images, SPECT images, and the like, of the patient undergoing radiotherapy may be obtained non-invasively by the image acquisition device 132 to reveal the internal structure of a body part. Based on the information from the medical images, a 3D structure of the relevant anatomical portion may be obtained and used to generate a contour of the image. Contours of the image can include data overlaid on top of the image that delineates one or more structures of the anatomy. In some cases, the contours can be files associated with respective images that specify the coordinates or 2D or 3D locations of various structures of the anatomy depicted in the images.

In addition, during a treatment planning process, many parameters may be taken into consideration to achieve a balance between efficient treatment of the target tumor (e.g., such that the target tumor receives enough radiation dose for an effective therapy) and low irradiation of the OAR(s) (e.g., the OAR(s) receives as low a radiation dose as possible). Other parameters that may be considered include the location of the target organ and the target tumor, the location of the OAR, and the movement of the target in relation to the OAR. For example, the 3D structure may be obtained by contouring the target or contouring the OAR within each 2D layer or slice of an MRI or CT image and combining the contour of each 2D layer or slice. The contour may be generated manually (e.g., by a physician, dosimetrist, or health care worker using a program such as MONACO™ manufactured by Elekta AB of Stockholm, Sweden) or automatically (e.g., using a program such as the Atlas-based auto-segmentation software, ABAS™, manufactured by Elekta AB of Stockholm, Sweden). In certain embodiments, the 3D structure of a target tumor or an OAR may be generated automatically by the treatment planning software.

After the target tumor and the OAR(s) have been located and delineated, a dosimetrist, physician, or healthcare worker may determine a dose of radiation to be applied to the target tumor, as well as any maximum amounts of dose that may be received by the OAR proximate to the tumor (e.g., left and right parotid, optic nerves, eyes, lens, inner ears, spinal cord, brain stem, and the like). After the radiation dose is determined for each anatomical structure (e.g., target tumor, OAR), a process known as inverse planning may be performed to determine one or more treatment plan parameters that would achieve the desired radiation dose distribution. Examples of treatment plan parameters include volume delineation parameters (e.g., which define target volumes, contour sensitive structures, etc.), margins around the target tumor and OARs, beam angle selection, collimator settings, and beam-on times. During the inverse-planning process, the physician may define dose constraint parameters that set bounds on how much radiation an OAR may receive (e.g., defining full dose to the tumor target and zero dose to any OAR; defining 95% of dose to the target tumor; defining that the spinal cord, brain stem, and optic structures receive ≤45 Gy, ≤55 Gy and ≤54 Gy, respectively). The result of inverse planning may constitute a radiation therapy treatment plan 142 that may be stored in memory device 116 or database 124. Some of these treatment parameters may be correlated. For example, tuning one parameter (e.g., weights for different objectives, such as increasing the dose to the target tumor) in an attempt to change the treatment plan may affect at least one other parameter, which in turn may result in the development of a different treatment plan. Thus, the image processing device 112 can generate a tailored radiation therapy treatment plan 142 having these parameters in order for the radiation therapy device 130 to provide radiotherapy treatment to the patient.

In addition, the radiotherapy system 100 may include a display device 134 and a user interface 136. The display device 134 may include one or more display screens that display medical images, interface information, treatment planning parameters (e.g., projection images, graphical aperture images, contours, dosages, beam angles, etc.) treatment plans, a target, localizing a target and/or tracking a target, or any related information to the user. The user interface 136 may be a keyboard, a keypad, a touch screen or any type of device that a user may input information to radiotherapy system 100. Alternatively, the display device 134 and the user interface 136 may be integrated into a device such as a tablet computer (e.g., Apple iPad®, Lenovo Thinkpad®, Samsung Galaxy®, etc.).

Furthermore, any and all components of the radiotherapy system 100 may be implemented as a virtual machine (e.g., VMWare, Hyper-V, and the like). For instance, a virtual machine can be software that functions as hardware. Therefore, a virtual machine can include at least one or more virtual processors, one or more virtual memories, and one or more virtual communication interfaces that together function as hardware. For example, the image processing device 112, the OIS 128, the image acquisition device 132 could be implemented as a virtual machine. Given the processing power, memory, and computational capability available, the entire radiotherapy system 100 could be implemented as a virtual machine.

Figure 2A:
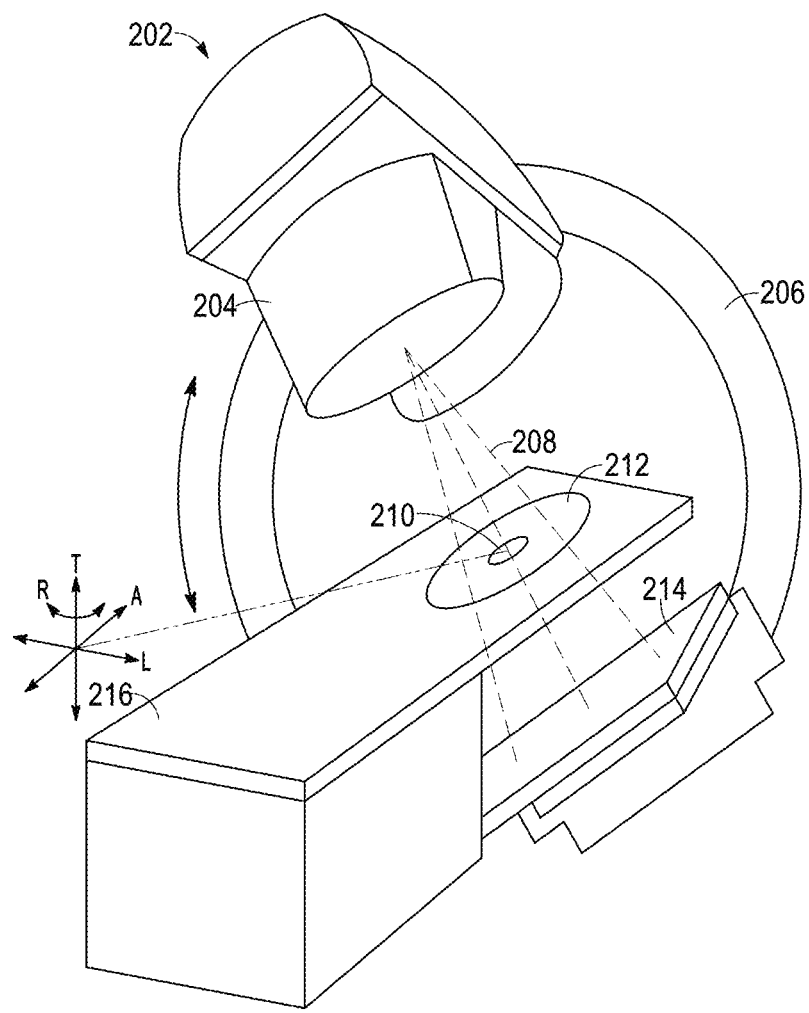
FIG. 2A illustrates an exemplary radiation therapy system that can include radiation therapy output configured to provide a therapy beam, according to some embodiments of the present disclosure.

FIG. 2A illustrates an exemplary radiation therapy device 202 that may include a radiation source, such as an X-ray source or a linear accelerator, a couch 216, an imaging detector 214, and a radiation therapy output 204. The radiation therapy device 202 may be configured to emit a radiation beam 208 to provide therapy to a patient. The radiation therapy output 204 can include one or more attenuators or collimators, such as an MLC as described in the illustrative embodiment of FIG. 5, below.

Referring back to FIG. 2A, a patient can be positioned in a region 212 and supported by the treatment couch 216 to receive a radiation therapy dose, according to a radiation therapy treatment plan. The radiation therapy output 204 can be mounted or attached to a gantry 206 or other mechanical support. One or more chassis motors (not shown) may rotate the gantry 206 and the radiation therapy output 204 around couch 216 when the couch 216 is inserted into the treatment area. In an embodiment, gantry 206 may be continuously rotatable around couch 216 when the couch 216 is inserted into the treatment area. In another embodiment, gantry 206 may rotate to a predetermined position when the couch 216 is inserted into the treatment area. For example, the gantry 206 can be configured to rotate the therapy output 204 around an axis ("A"). Both the couch 216 and the radiation therapy output 204 can be independently moveable to other positions around the patient, such as moveable in transverse direction ("T"), moveable in a lateral direction ("L"), or as rotation about one or more other axes, such as rotation about a transverse axis (indicated as "R"). A controller communicatively connected to one or more actuators (not shown) may control the couch 216 movements or rotations in order to properly position the patient in or out of the radiation beam 208 according to a radiation therapy treatment plan. Both the couch 216 and the gantry 206 are independently moveable from one another in multiple degrees of freedom, which allows the patient to be positioned such that the radiation beam 208 precisely can target the tumor. The MLC may be integrated and included within gantry 206 to deliver the radiation beam 208 of a certain shape.

The coordinate system (including axes A, T, and L) shown in FIG. 2A can have an origin located at an isocenter 210. The isocenter can be defined as a location where the central axis of the radiation beam 208 intersects the origin of a coordinate axis, such as to deliver a prescribed radiation dose to a location on or within a patient. Alternatively, the isocenter 210 can be defined as a location where the central axis of the radiation beam 208 intersects the patient for various rotational positions of the radiation therapy output 204 as positioned by the gantry 206 around the axis A. As discussed herein, the gantry angle corresponds to the position of gantry 206 relative to axis A, although any other axis or combination of axes can be referenced and used to determine the gantry angle.

Gantry 206 may also have an attached imaging detector 214. The imaging detector 214 is preferably located opposite to the radiation source, and in an embodiment, the imaging detector 214 can be located within a field of the therapy beam 208.

The imaging detector 214 can be mounted on the gantry 206 (preferably opposite the radiation therapy output 204), such as to maintain alignment with the therapy beam 208. The imaging detector 214 rotates about the rotational axis as the gantry 206 rotates. In an embodiment, the imaging detector 214 can be a flat panel detector (e.g., a direct detector or a scintillator detector). In his manner, the imaging detector 214 can be used to monitor the therapy beam 208 or the imaging detector 214 can be used for imaging the patient's anatomy, such as portal imaging. The control circuitry of radiation therapy device 202 may be integrated within system 100 or remote from it.

In an illustrative embodiment, one or more of the couch 216, the therapy output 204, or the gantry 206 can be automatically positioned, and the therapy output 204 can establish the therapy beam 208 according to a specified dose for a particular therapy delivery instance. A sequence of therapy deliveries can be specified according to a radiation therapy treatment plan, such as using one or more different orientations or locations of the gantry 206, couch 216, or therapy output 204. The therapy deliveries can occur sequentially, but can intersect in a desired therapy locus on or within the patient, such as at the isocenter 210. A prescribed cumulative dose of radiation therapy can thereby be delivered to the therapy locus while damage to tissue near the therapy locus can be reduced or avoided.

Figure 2B:
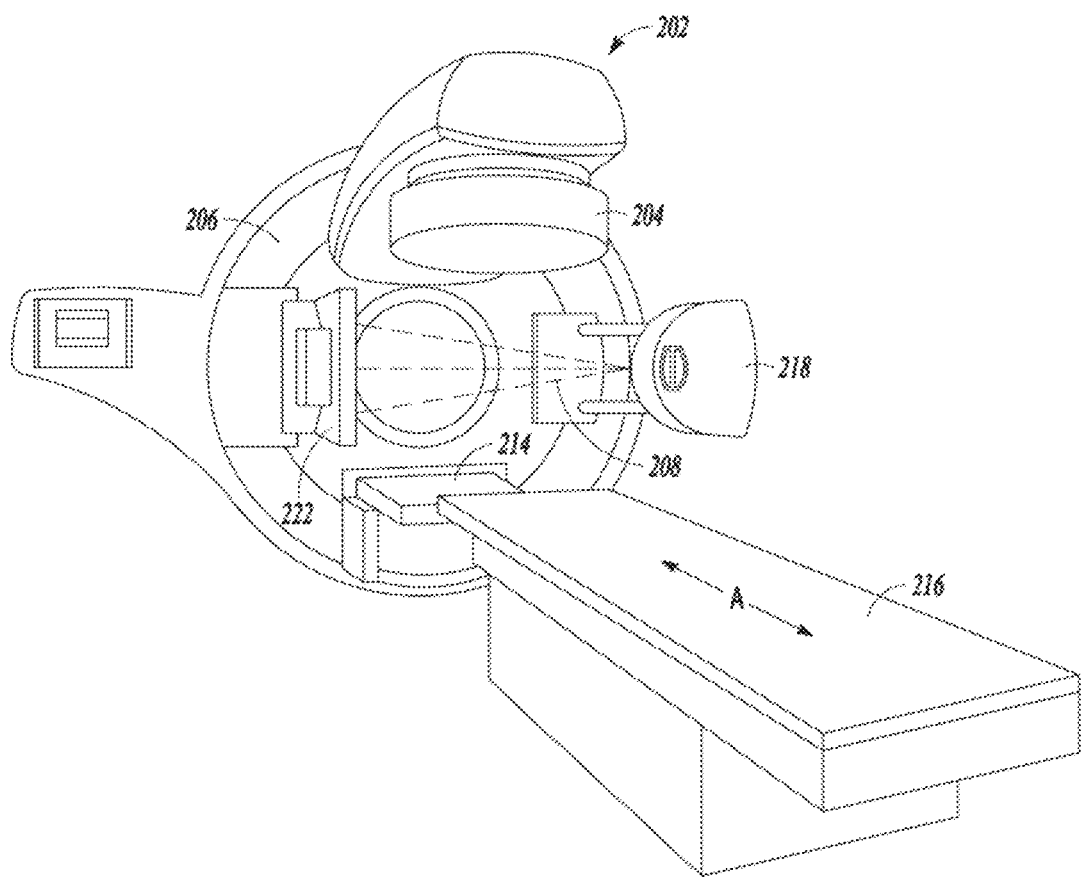
FIG. 2B illustrates an exemplary system including a combined radiation therapy system and an imaging system, such as a cone beam computed tomography (CBCT) imaging system, according to some embodiments of the present disclosure.

FIG. 2B illustrates an exemplary radiation therapy device 202 that may include a combined linac and an imaging system, such as can include a CT imaging system. The radiation therapy device 202 can include an MLC (not shown). The CT imaging system can include an imaging X-ray source 218, such as providing X-ray energy in a kiloelectron-Volt (keV) energy range. The imaging X-ray source 218 can provide a fan-shaped and/or a conical beam 208 directed to an imaging detector 222, such as a flat panel detector. The radiation therapy device 202 can be similar to the system described in relation to FIG. 2A, such as including a radiation therapy output 204, a gantry 206, a couch 216, and another imaging detector 214 (such as a flat panel detector). The X-ray source 218 can provide a comparatively-lower-energy X-ray diagnostic beam, for imaging.

In the illustrative embodiment of FIG. 2B, the radiation therapy output 204 and the X-ray source 218 can be mounted on the same rotating gantry 206, rotationally-separated from each other by 90 degrees. In another embodiment, two or more X-ray sources can be mounted along the circumference of the gantry 206, such as each having its own detector arrangement to provide multiple angles of diagnostic imaging concurrently. Similarly, multiple radiation therapy outputs 204 can be provided.

Figure 3:
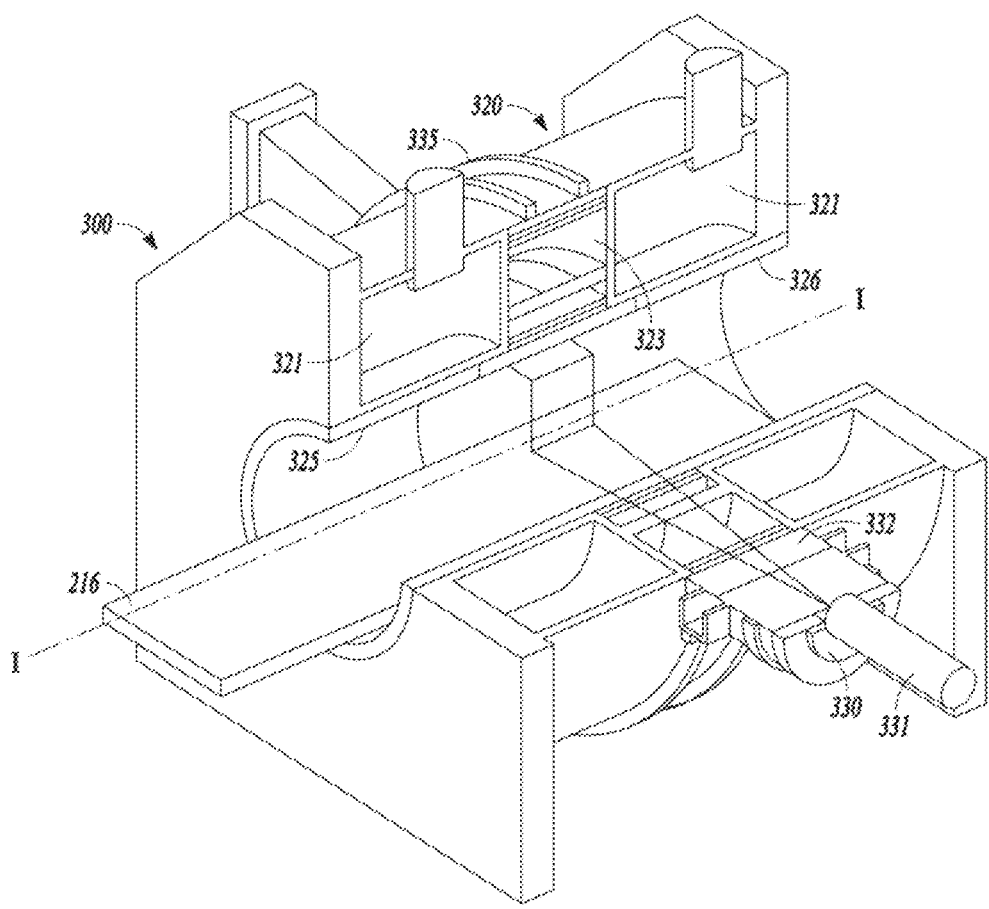
FIG. 3 illustrates a partially cut-away view of an exemplary system including a combined radiation therapy system and an imaging system, such as a nuclear magnetic resonance (MR) imaging (MRI) system, according to some embodiments of the present disclosure.
Figure 4A:
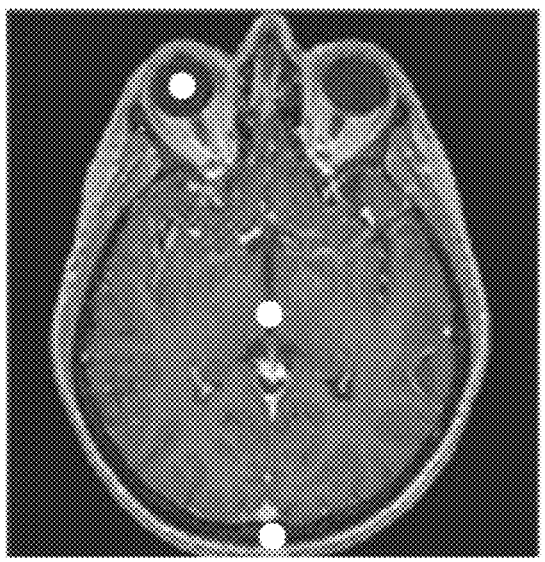
FIGS. 4A and 4B depict the differences between an exemplary MRI image and a corresponding CT image, respectively, according to some embodiments of the present disclosure.
Figure 4B:

FIG. 3 depicts an exemplary radiation therapy system 300 that can include combining a radiation therapy device 202 and an imaging system, such as a nuclear MR imaging system (e.g., known in the art as an MR-linac) consistent with the disclosed embodiments. As shown, system 300 may include a couch 216, an image acquisition device 320, and a radiation delivery device 330. System 300 delivers radiation therapy to a patient in accordance with a radiotherapy treatment plan. In some embodiments, image acquisition device 320 may correspond to image acquisition device 132 in FIG. 1 that may acquire origin images of a first modality (e.g., MRI image shown in FIG. 4A) or destination images of a second modality (e.g., CT image shown in FIG. 4B).

Couch 216 may support a patient (not shown) during a treatment session. In some implementations, couch 216 may move along a horizontal translation axis (labelled "I"), such that couch 216 can move the patient resting on couch 216 into and/or out of system 300. Couch 216 may also rotate around a central vertical axis of rotation, transverse to the translation axis. To allow such movement or rotation, couch 216 may have motors (not shown) enabling the couch to move in various directions and to rotate along various axes. A controller (not shown) may control these movements or rotations in order to properly position the patient according to a treatment plan.

In some embodiments, image acquisition device 320 may include an MRI machine used to acquire 2D or 3D MRI images of the patient before, during, and/or after a treatment session. Image acquisition device 320 may include a magnet 321 for generating a primary magnetic field for magnetic resonance imaging. The magnetic field lines generated by operation of magnet 321 may run substantially parallel to the central translation axis I. Magnet 321 may include one or more coils with an axis that runs parallel to the translation axis I. In some embodiments, the one or more coils in magnet 321 may be spaced such that a central window 323 of magnet 321 is free of coils. In other embodiments, the coils in magnet 321 may be thin enough or of a reduced density such that they are substantially transparent to radiation of the wavelength generated by radiotherapy device 330. Image acquisition device 320 may also include one or more shielding coils, which may generate a magnetic field outside magnet 321 of approximately equal magnitude and opposite polarity in order to cancel or reduce any magnetic field outside of magnet 321. As described below, radiation source 331 of radiotherapy device 330 may be positioned in the region where the magnetic field is cancelled, at least to a first order, or reduced.

Image acquisition device 320 may also include two gradient coils 325 and 326, which may generate a gradient magnetic field that is superposed on the primary magnetic field. Coils 325 and 326 may generate a gradient in the resultant magnetic field that allows spatial encoding of the protons so that their position can be determined. Gradient coils 325 and 326 may be positioned around a common central axis with the magnet 321 and may be displaced along that central axis. The displacement may create a gap, or window, between coils 325 and 326. In embodiments where magnet 321 can also include a central window 323 between coils, the two windows may be aligned with each other.

In some embodiments, image acquisition device 320 may be an imaging device other than an MRI, such as an X-ray, a CT, a CBCT, a spiral CT, a PET, a SPECT, an optical tomography, a fluorescence imaging, ultrasound imaging, radiotherapy portal imaging device, or the like. As would be recognized by one of ordinary skill in the art, the above description of image acquisition device 320 concerns certain embodiments and is not intended to be limiting.

Figure 5:
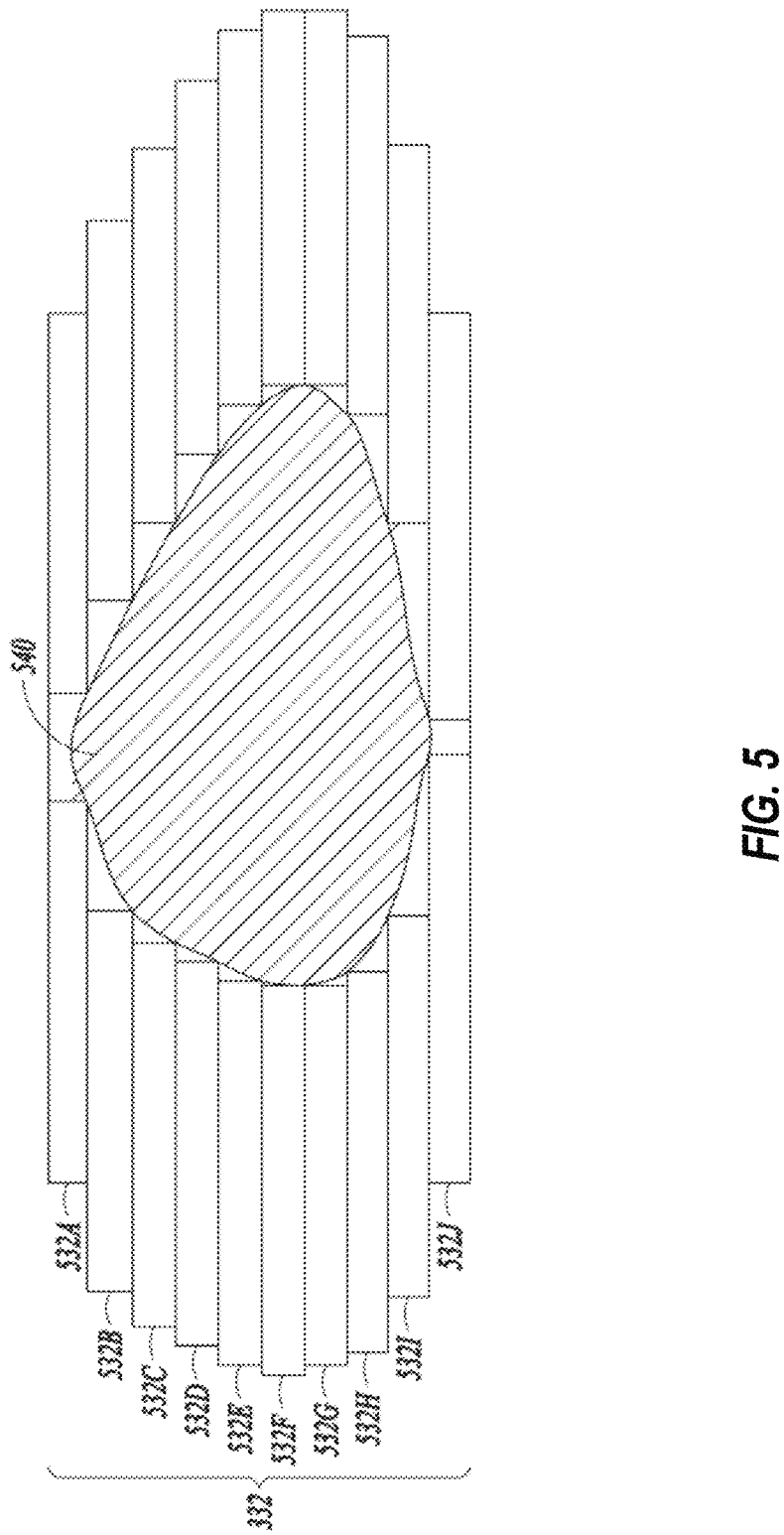
FIG. 5 illustrates an exemplary collimator configuration for shaping, directing, or modulating an intensity of a radiation therapy beam, according to some embodiments of the present disclosure.

Radiotherapy device 330 may include the radiation source 331, such as an source or a linac, and an MLC 332 (shown below in FIG. 5). Radiotherapy device 330 may be mounted on a chassis 335. One or more chassis motors (not shown) may rotate chassis 335 around couch 216 when couch 216 is inserted into the treatment area. In an embodiment, chassis 335 may be continuously rotatable around couch 216, when couch 216 is inserted into the treatment area. Chassis 335 may also have an attached radiation detector (not shown), preferably located opposite to radiation source 331 and with the rotational axis of chassis 335 positioned between radiation source 331 and the detector. Further, device 330 may include control circuitry (not shown) used to control, for example, one or more of couch 216, image acquisition device 320, and radiotherapy device 330. The control circuitry of radiotherapy device 330 may be integrated within system 300 or remote from it.

During a radiotherapy treatment session, a patient may be positioned on couch 216. System 300 may then move couch 216 into the treatment area defined by magnetic 321 and coils 325, 326, and chassis 335. Control circuitry may then control radiation source 331, MLC 332, and the chassis motor(s) to deliver radiation to the patient through the window between coils 325 and 326 according to a radiotherapy treatment plan.

FIG. 2A, FIG. 2B, and FIG. 3 illustrate generally illustrate embodiments of a radiation therapy device configured to provide radiotherapy treatment to a patient, including a configuration where a radiation therapy output can be rotated around a central axis (e.g., an axis "A"). Other radiation therapy output configurations can be used. For example, a radiation therapy output can be mounted to a robotic arm or manipulator having multiple degrees of freedom. In yet another embodiment, the therapy output can be fixed, such as located in a region laterally separated from the patient, and a platform supporting the patient can be used to align a radiation therapy isocenter with a specified target locus within the patient.

As discussed above, radiation therapy devices described by FIG. 2A, FIG. 2B, and FIG. 3 include an MLC for shaping, directing, or modulating an intensity of a radiation therapy beam to the specified target locus within the patient. FIG. 5 illustrates an exemplary MLC 332 that includes leaves 532A through 532J that can be automatically positioned to define an aperture approximating a tumor 540 cross section or projection. The leaves 532A through 532J permit modulation of the radiation therapy beam. The leaves 532A through 532J can be made of a material specified to attenuate or block the radiation beam in regions other than the aperture, in accordance with the radiation treatment plan. For example, the leaves 532A through 532J can include metallic plates, such as comprising tungsten, with a long axis of the plates oriented parallel to a beam direction and having ends oriented orthogonally to the beam direction (as shown in the plane of the illustration of FIG. 2A). A "state" of the MLC 332 can be adjusted adaptively during a course of radiation therapy treatment, such as to establish a therapy beam that better approximates a shape or location of the tumor 540 or another target locus. This is in comparison to using a static collimator configuration or as compared to using an MLC 332 configuration determined exclusively using an "offline" therapy planning technique. A radiation therapy technique using the MLC 332 to produce a specified radiation dose distribution to a tumor or to specific areas within a tumor can be referred to as IMRT.

Figure 6:
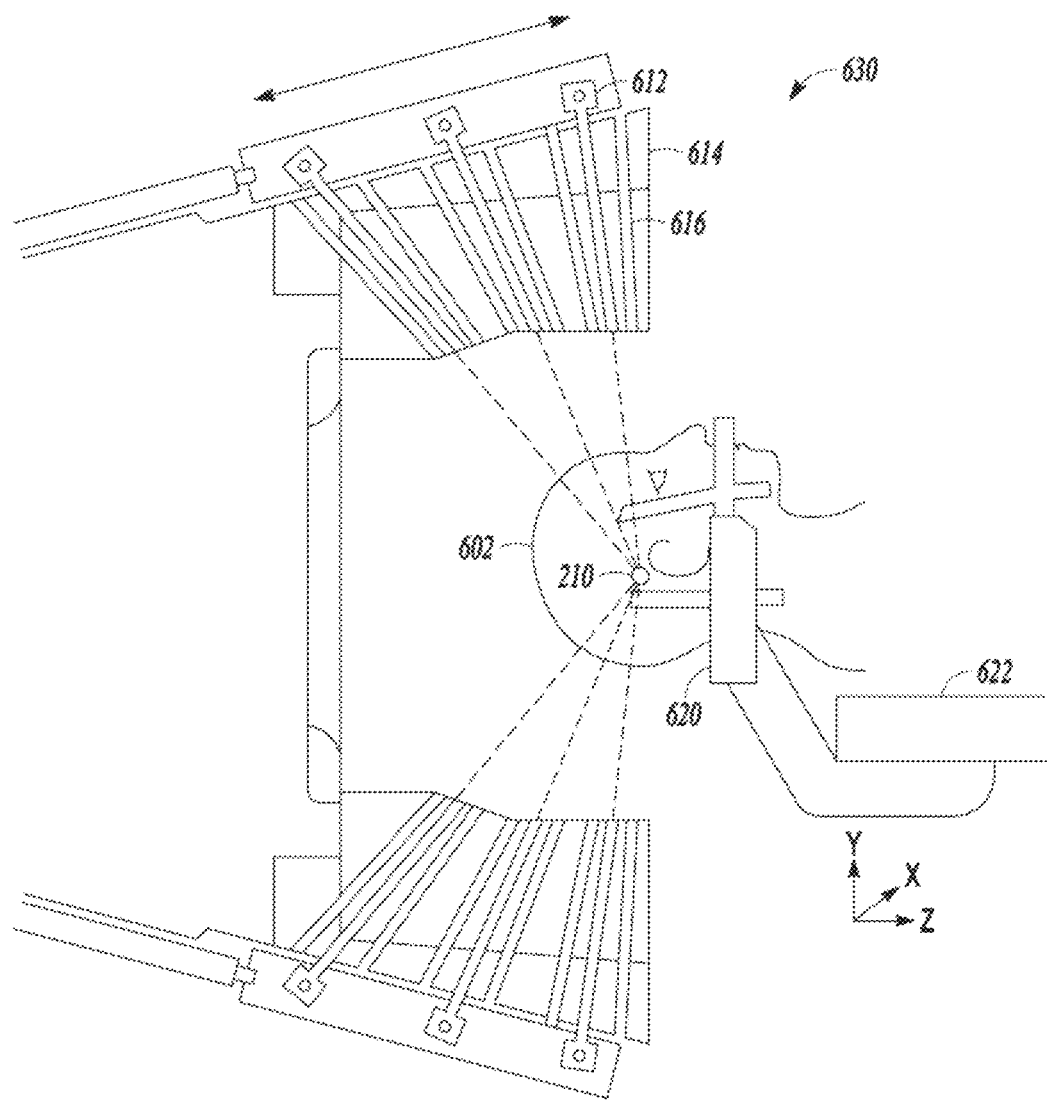
FIG. 6 illustrates an exemplary Gamma Knife radiation therapy system, according to some embodiments of the present disclosure.

FIG. 6 illustrates an embodiment of another type of radiotherapy device 630 (e.g., a Leksell Gamma Knife), according to some embodiments of the present disclosure. As shown in FIG. 6, in a radiotherapy treatment session, a patient 602 may wear a coordinate frame 620 to keep stable the patient's body part (e.g., the head) undergoing surgery or radiotherapy. Coordinate frame 620 and a patient positioning system 622 may establish a spatial coordinate system, which may be used while imaging a patient or during radiation surgery. Radiotherapy device 630 may include a protective housing 614 to enclose a plurality of radiation sources 612. Radiation sources 612 may generate a plurality of radiation beams (e.g., beamlets) through beam channels 616. The plurality of radiation beams may be configured to focus on an isocenter 210 from different directions. While each individual radiation beam may have a relatively low intensity, isocenter 210 may receive a relatively high level of radiation when multiple doses from different radiation beams accumulate at isocenter 210. In certain embodiments, isocenter 210 may correspond to a target under surgery or treatment, such as a tumor.

Figure 7:
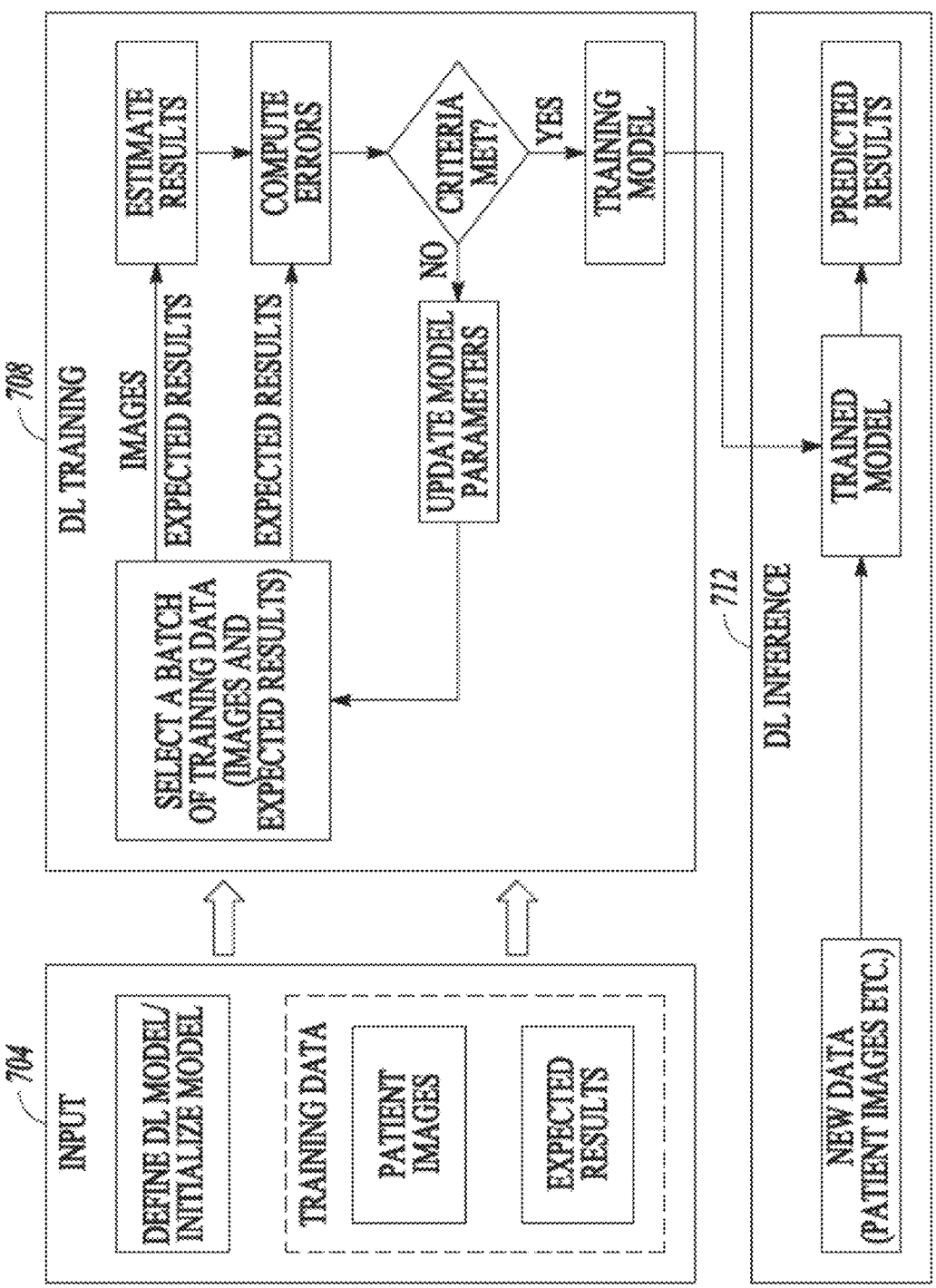
FIG. 7 illustrates an exemplary flow diagram for deep learning, according to some embodiments of the present disclosure.

FIG. 7 illustrates an exemplary flow diagram for deep learning, where a deep learning model (or a machine learning model), such as a deep convolutional neural network (DCNN), can be trained and used to determine a biomechanically accurate DVF from pair of data sets associated with input images (e.g., a pair or set of input images themselves and/or contours of the images) to produce or update a treatment plan. Inputs 704 can include a defined deep learning model having an initial set of values and training data. The training data can include patient images and expected results. The training data can also include data based on the patient images, such as one or more of anatomy label maps or signed distance maps and/or contours of images. The training data can also include paired data including a first image (a fixed image or reference image) of a patient anatomy and a second image (moving image) of the same patient anatomy paired with a ground-truth biomechanically accurate DVF of the images. The training data can include multiple of these paired images for multiple patients. In some cases, the training data includes pairs of contour sets (a first set of one or more contours of a fixed image and a second set of one or more contours of a moving image) and their respective ground truth biomechanically accurate DVF representations of the mapping of pixels or voxels from one contour set to another. In some cases, the training data includes pairs of contours (a first set of one or more contours of a fixed image and a second set of one or more contours of a moving image) together with their respective images and their respective ground truth biomechanically accurate DVF representations of the mapping of pixels or voxels from one image to another.

The deep learning model can include a neural network, such as a deep convolutional neural network (DCNN). The deep learning network can be trained on medical images and/or contour sets of the medical images along with the ground truth biomechanically accurate DVF representations of the images and/or contour sets. The training medical images can include projection images of an anatomy, CT images, PET images, or MRI images. When trained, the deep learning network can produce an estimate of the biomechanically accurate DVF for a given pair of images and/or contour sets. The expected results can include estimated biomechanically accurate DVF that can be used to compute a change in an amount of dose delivered to a target and/or movement of the target between time points when the images were captured and such information can be used for defining the delivery of radiation treatment to a patient (e.g., to update the control points or machine parameters of a radiotherapy treatment device). The control points or machine parameters can include at least one gantry angle, at least one multi-leaf collimator leaf position, and at least one aperture weight or intensity.

During training of deep learning (DL) model 708, a batch of training data can be selected from the patient images (or data associated with or derived from the patient images) and/or contour sets associated with the images (or data associated with or derived from the patient images) and expected results (e.g., the corresponding ground-truth biomechanically accurate DVF). The selected training data can include at least one image (or data associated with or derived from the patient image) and/or a contour set of patient anatomy captured at a first point in time and at least another image (or data associated with or derived from the another image) and/or contour set of the patient anatomy captured at a second point in time. The selected training data includes the corresponding ground truth biomechanically accurate DVF representation of the mapping of pixels or voxels from the at least one image (or data associated with or derived from the image) and/or contour set of patient anatomy captured at the first point in time to the at least another image (or data associated with or derived from the another image) and/or contour set of the patient anatomy captured at the second point in time. In one example, the training data is initially generated by obtaining the at least one image (or data associated with or derived from the patient image) and/or contour set of patient anatomy captured at the first point in time and the at least another image (or data associated with or derived from the another images) and/or contour set of the patient anatomy captured at the second point in time and applying a BDIR technique to the images (or data associated with or derived from the images) and/or contour sets to generate the respective ground-truth biomechanically accurate DVF representation.

As an example, a first set of training data can be generated by obtaining a first image (or data associated with or derived from the first image) of a patient anatomy captured at a first point in time and a second image (or data associated with or derived from the second image) of the patient anatomy captured at a second point in time. A BDIR technique is applied to the first and second images (or data associated with or derived from the first/second images) to generate the respective ground-truth biomechanically accurate DVF representation. The process is repeated to generate the biomechanically accurate ground-truth DVF representations for additional sets or pairs of images (or data associated with or derived from the pairs of images) of the same or different patient anatomy, where each pair represents the same patient anatomy captured at different points in time. In this case, the DL model is trained to produce, predict or estimate an biomechanically accurate DVF for a given pair of images of a patient anatomy.

As another example, a second set of training data can be generated by obtaining a first image (or data associated with or derived from the first image) of a patient anatomy captured at a first point in time, a first contour set of the first image (or data associated with or derived from the first image) delineating one or more anatomical structures in the first image, a second image (or data associated with or derived from the second image) of the patient anatomy captured at a second point in time, and a second contour set of the second image (or data associated with or derived from the second image) delineating one or more anatomical structures in the second image. A BDIR technique is applied to the first and second images (or data associated with or derived from the first/second images) along with the first and second contour sets to generate the respective ground-truth biomechanically accurate DVF representation. The process is repeated to generate the biomechanically accurate ground-truth DVF representations for additional sets or pairs of images and respective contour sets of the same or different patient anatomy, where each pair represents the same patient anatomy captured at different points in time. In this case, the DL model is trained to produce, predict or estimate an biomechanically accurate DVF for a given pair of images (or data associated with or derived from the given pair of images) of a patient anatomy when received with their respective contour sets.

As another example, a third set of training data can be generated by obtaining a first contour set of a patient anatomy derived from an image (or data associated with or derived from the image) captured at a first point in time and a second contour set of the patient anatomy derived from another image (or data associated with or derived from the another image) captured at a second point in time. A BDIR technique is applied to the first and second contour sets to generate the respective ground-truth biomechanically accurate DVF representation. The process is repeated to generate the biomechanically accurate ground-truth DVF representations for additional sets or pairs of contour sets of the same or different patient anatomy, where each pair represents the same patient anatomy captured at different points in time. In this case, the DL model is trained to produce, predict or estimate an biomechanically accurate DVF for a given pair of contour sets derived from images of a patient anatomy.

The deep learning model can be applied to the selected pairs of images (or data associated with or derived from the selected pairs of images) and/or contour sets to provide estimated results (e.g., estimated biomechanically accurate DVF representations), which can then be compared to the expected results (e.g., ground truth biomechanically accurate DVF representations) to compute a difference or deviation that can provide an indication of training errors. The errors can be used during a procedure called backpropagation to correct the errors in parameters of the deep learning network (e.g., layer node weights and biases), such as to reduce or minimize errors in the biomechanically accurate DVF estimates during subsequent trials. The errors can be compared to predetermined criteria, such as proceeding to a sustained minimum for a specified number of training iterations. If the errors do not satisfy the predetermined criteria, then model parameters of the deep learning model can be updated using backpropagation, and another batch of training data can be selected from the other sets of training data (of the same patient or other patients) and expected results for another iteration of deep learning model training. If the errors satisfy the predetermined criteria, then the training can be ended, and the trained model can then be used during a deep learning testing or inference stage 712 to predict biomechanically accurate DVF representations based on images and/or contour sets from the training data. The trained model can receive new images and/or contour sets representing views of an anatomy and provide predicted results (e.g., biomechanically accurate DVF representations).

After updating the parameters of the DCNN, the iteration index can be incremented by a value of one. The iteration index can correspond to a number of times that the parameters of the DCNN have been updated. Stopping criteria can be computed, and if the stopping criteria are satisfied, then the DCNN model can be saved in a memory, such as the memory device 116 of image processing device 112, and the training can be halted. If the stopping criteria are not satisfied, then the training can continue by obtaining another batch of training images (or data associated with or derived from the training images) from the same training subject or another training subject. In an embodiment, the stopping criteria can include a value of the iteration index (e.g., the stopping criteria can include whether the iteration index is greater than or equal to a determined maximum number of iterations). In an embodiment, the stopping criteria can include an accuracy of the output biomechanically accurate DVF representation (e.g. the stopping criteria can include whether the difference between the output estimated biomechanically accurate DVF representation and the ground-truth biomechanically accurate DVF representation in the batch of training data is smaller than a threshold).

After the DL model is trained, a pair of medical images (or data associated with or derived from the pair of images) of an anatomy can be received from an image acquisition device, such as image acquisition device 132. The pair of medical images (or data associated with or derived from the images) can include a reference or fixed image captured or generated at a first point in time and a medical image (or data associated with or derived from the image) or moving image captured or generated at a second point in time (e.g., in real-time during treatment of a patient). A trained DCNN model can be received from a network, such as the network 120, or from a memory, such as the memory device 116 of image processing device 112. The trained DCNN can be used to determine the biomechanically accurate DVF representation of the pair of medical images.

In another embodiment, after the DL model is trained, a pair of medical images (or data associated with or derived from the images) of an anatomy together with their respective contour sets can be received from an image acquisition device, such as image acquisition device 132. The pair of medical images (or data associated with or derived from the images) can include a reference or fixed image captured or generated at a first point in time and a medical image or moving image captured or generated at a second point in time (e.g., in real-time during treatment of a patient). A trained DCNN model can be received from a network, such as the network 120, or from a memory, such as the memory device 116 of image processing device 112. The trained DCNN can be used to determine the biomechanically accurate DVF representation of the pair of medical images and their respective contour sets.

In another embodiment, after the DL model is trained, a pair of contour sets (each contour sets in the pair of contour sets representing one or more structures depicted in a medical image) derived from medical images (or data associated with or derived from the images) of an anatomy can be received from an image acquisition device, such as image acquisition device 132. The pair of contour sets can be generated from a reference or fixed image captured or generated at a first point in time and a medical image or moving image captured or generated at a second point in time (e.g., in real-time during treatment of a patient). A trained DCNN model can be received from a network, such as the network 120, or from a memory, such as the memory device 116 of image processing device 112. The trained DCNN can be used to determine the biomechanically accurate DVF representation of the pair of contour sets.

The disclosed embodiments improve the quality and speed at which a mapping or transformation of pixels or voxels from one image to another are created using biomechanically accurate DVF prediction (e.g., a DL Plan Estimate). This speeds up the radiotherapy treatment planning and delivery.

Figure 8:
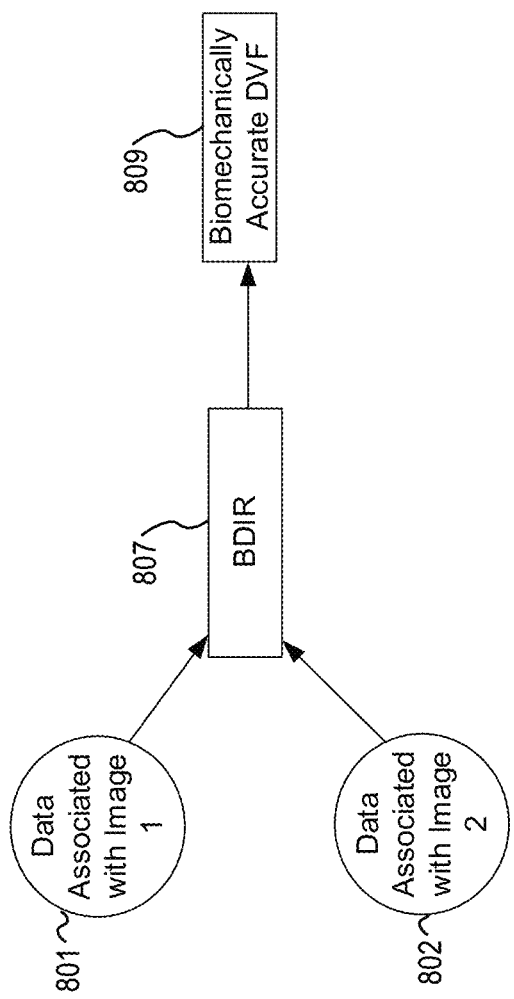
FIG. 8 illustrates an exemplary flow diagram for generating training data for deep learning, according to some embodiments of the present disclosure.

FIG. 8 illustrates an exemplary flow diagram for generating training data for deep learning, according to some embodiments of the present disclosure. For example, a first training image 801 (or data associated with or derived from the first image 801) and a second training image 802 (or data associated with or derived from the second image 802) can be received. In some cases, the first training image 801 is segmented to generate a set of contours of anatomical regions depicted in the first training image 801. In some cases, the second training image 802 is segmented to generate a set of contours of anatomical regions depicted in the second training image 802. The first training image 801 may have been captured at a first point in time and represents a target in a patient at the first point in time. The second training image 802 may have been captured at a second point in time (before or after the first point in time) and represents the target in a patient at the second point in time.

In some embodiments, a BDIR 807 is applied to the first training image 801 (or data associated with or derived from the image 801) with or without the set of contours associated with the first training image 801 and to the second training image 802 (or data associated with or derived from the second image 802) with or without the set of contours associated with the second training image 802. The BDIR 807 generates a biomechanically accurate DVF representation 809 at the output. This biomechanically accurate DVF representation 809 is stored in association with the paired first and second training images 801 and 802 as a paired set of training data. A collection of pairs of images (each pair depicting a same patient anatomy at differ points in time) is received and processed in a similar manner to generate the associated biomechanically accurate DVF representation for each pair in the collection.

In some embodiments, a BDIR 807 is applied to a first set of contours associated with the first training image 801 and a second set of contours associated with the second training image 802. The BDIR 807 generates a biomechanically accurate DVF representation 809 at the output representing a mapping or transformation of the first set of contours to the second set of contours. This biomechanically accurate DVF representation 809 is stored in association with the paired first and second sets of contours as a paired set of training data. A collection of pairs of contours (each pair depicting a same or different patient anatomy at different points in time) is received and processed in a similar manner to generate the associated biomechanically accurate DVF representation for each pair in the collection.

Figure 9:
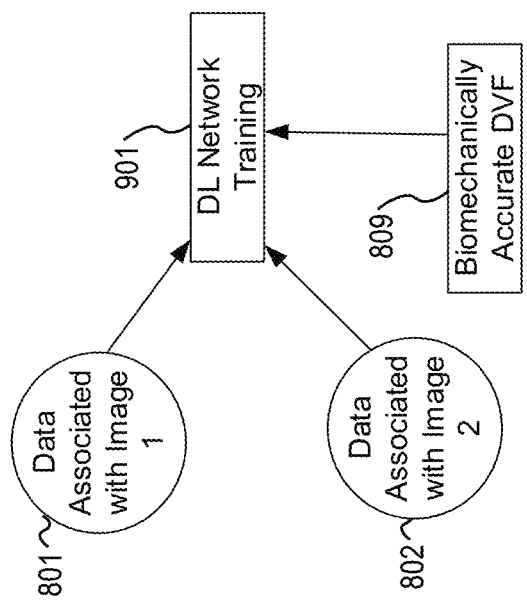
FIG. 9 illustrates an exemplary method for training deep learning using images and an accurate DVF, according to some embodiments of the present disclosure.

FIG. 9 illustrates an exemplary method for training deep learning using images and a biomechanically accurate DVF, according to some embodiments of the present disclosure. Specifically, after the training data is generated according to the process discussed in connection with FIG. 8, a DL model is trained using the training data. In some cases, multiple DL models are trained based on different sets of training data.

For example, a first DL model is trained to receive a pair of input images with respective contours (e.g., segmented images) and generates or predicts a biomechanically accurate DVF for the pair of input images. In such cases, the DL model is trained based on training images that include respective sets of contours along with the associated ground truth biomechanically accurate DVFs of the training images.

As another example, a second DL model is trained to receive a pair of input images (or data associated with or derived from the pair of images) without respective contour sets and generates or predicts a biomechanically accurate DVF for the pair of input images. In such cases, the DL model is trained based on training images along with the associated ground truth biomechanically accurate DVFs of the training images.

As another example, a third DL model is disclosed that can receive a pair of contour sets derived from images (or data associated with or derived from the images) of a patient anatomy and generates or predicts a biomechanically accurate DVF for the pair of contour sets. In such cases, the DL model is trained based on training data that includes sets of contour pairs (e.g., each pair includes a collection of one or more contours derived from a first image and a collection of one or more contours derived from a second image) along with the associated ground truth biomechanically accurate DVFs of the sets of contour pairs.

Specifically, the DL network training 901 includes an implementation of a DL model (e.g., the DL model discussed in FIG. 7). The DL network training 901 receives a first pair of images 801 and 802 and/or contour sets associated with such images. These images are the same as the images used to generate the biomechanically accurate DVF representation 809. The DL network training 901 also receives the generated biomechanically accurate DVF representation 809 associated with these images 801 and 802 and is trained to estimate a biomechanically accurate DVF representation for these images 801 and 802. For example, the DL network training 901 produces an estimated biomechanically accurate DVF representation based on the first and second images 801 and 802. The estimated biomechanically accurate DVF representation is then compared with the corresponding biomechanically accurate DVF representation 809 to compute a deviation or difference. This deviation or difference is applied to a loss function to update parameters of the DL model defined by the DL network training 901. Another set of paired images 801 and 802 and/or contour sets together with their corresponding generated biomechanically accurate DVF representation 809 is retrieved and similarly used to update parameters of the DL model.

Figure 10:
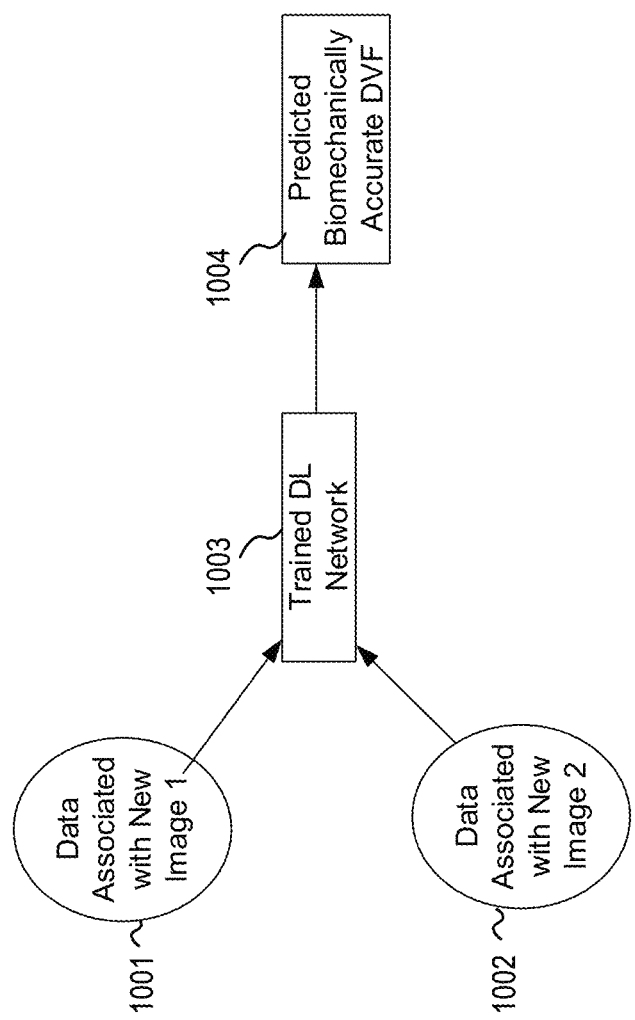
FIG. 10 illustrates an exemplary method for use of a machine learning model to generate an accurate DVF, according to some embodiments of the present disclosure.

FIG. 10 illustrates an exemplary method for use of a machine learning model to generate an accurate DVF, according to some embodiments of the present disclosure. As an example, a first new image 1001 is received together with a second new image 1002. The first new image 1001 can be a reference or fixed image of a patient anatomy and the second new image 1002 can be a moving image of the patient anatomy captured at a later point in time. The first new image 1001 and the second new image 1002 are input to the trained DL network 1003 (which can be the output of the DL network training 901 (FIG. 9)). The trained DL network 1003 generates or estimates the predicted biomechanically accurate DVF representation 1004 for the first new image 1001 and the second new image 1002. This predicted biomechanically accurate DVF representation 1004 represents the mapping of pixels and/or voxels from the first new image 1001 to the second new image 1002 taking into account biomechanical properties of tissues depicted in the images. Namely, the biomechanically accurate DVF maintains the biomechanical properties of tissues depicted in the images.

In some cases, the first new image 1002 and the second new image 1002 are segmented to generate contour sets associated with the images. The trained DL network 1003 can receive the images 1001 and 1002 alone, the images 1001 and 1002 and their respective contour sets, and/or the contour sets associated with the images 1001 and 1002 alone. Based on the received data, the trained DL network 1003 generates or estimates the predicted biomechanically accurate DVF representation 1004.

Figure 11:
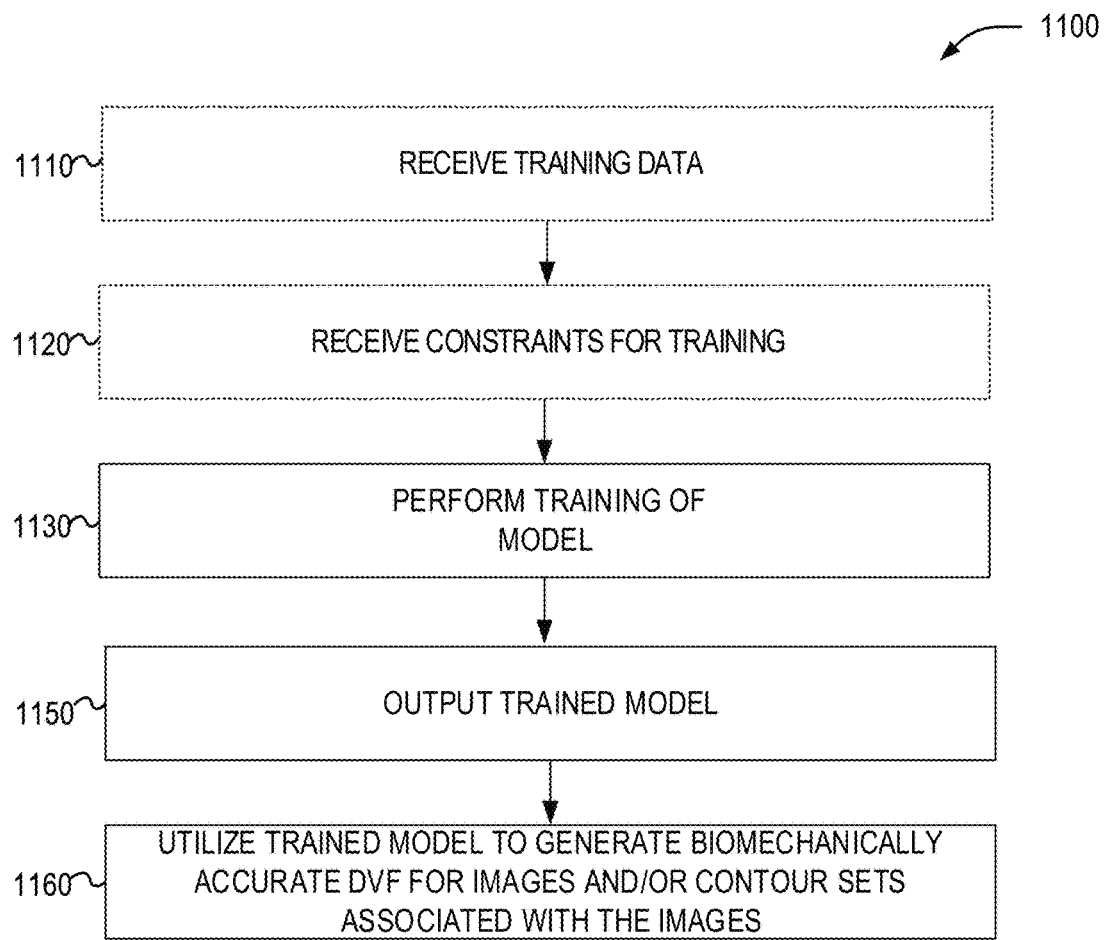
FIG. 11 illustrates an exemplary data flow for training and use of a machine learning model to generate an accurate DVF, according to some embodiments of the present disclosure.

FIG. 11 is a flowchart illustrating example operations of the image processing device 112 in performing process 1100, according to example embodiments. The process 1100 may be embodied in computer-readable instructions for execution by one or more processors such that the operations of the process 1100 may be performed in part or in whole by the functional components of the image processing device 112; accordingly, the process 1100 is described below by way of example with reference thereto. However, in other embodiments, at least some of the operations of the process 1100 may be deployed on various other hardware configurations. The process 1100 is therefore not intended to be limited to the image processing device 112 and can be implemented in whole, or in part, by any other component. Some or all of the operations of process 1100 can be in parallel, out of order, or entirely omitted.

At operation 1110, image processing device 112 receives training data. For example, image processing device 112 receives training data, which may include paired training data sets (e.g., input-output training pairs). Such training data may include a paired image of a patient anatomy with the ground truth biomechanically accurate DVF representation of the paired images.

At operation 1120, image processing device 112 receives constraints for training the model.

At operation 1130, image processing device 112 performs training of the model based on the received training data and constraints.

At operation 1150, image processing device 112 outputs the trained model. For example, image processing device 112 outputs the trained model to operate on a new set of paired images and/or contours associated with the images to estimate a biomechanically accurate DVF representation for the new set of paired images and/or contours associated with the images.

At operation 1160, image processing device 112 utilizes the trained model to generate biomechanically accurate DVF representations for images and/or contour sets associated with the images. For example, the image processing device 112 generates a biomechanically accurate DVF representation for a fixed image and a moving image. The image processing device 112 applies the generated biomechanically accurate DVF representation to compute an amount of dose delivered to a target between times at which the pairs of images were captured and/or movement of the target between the times at which the pairs of images were captured to deform dose delivered in a treatment session and/or compute the control points (e.g., the leaf positions, jaw positions, and beam intensity) for a radiotherapy device to be used during radiotherapy treatment of the patient.

Figure 12:
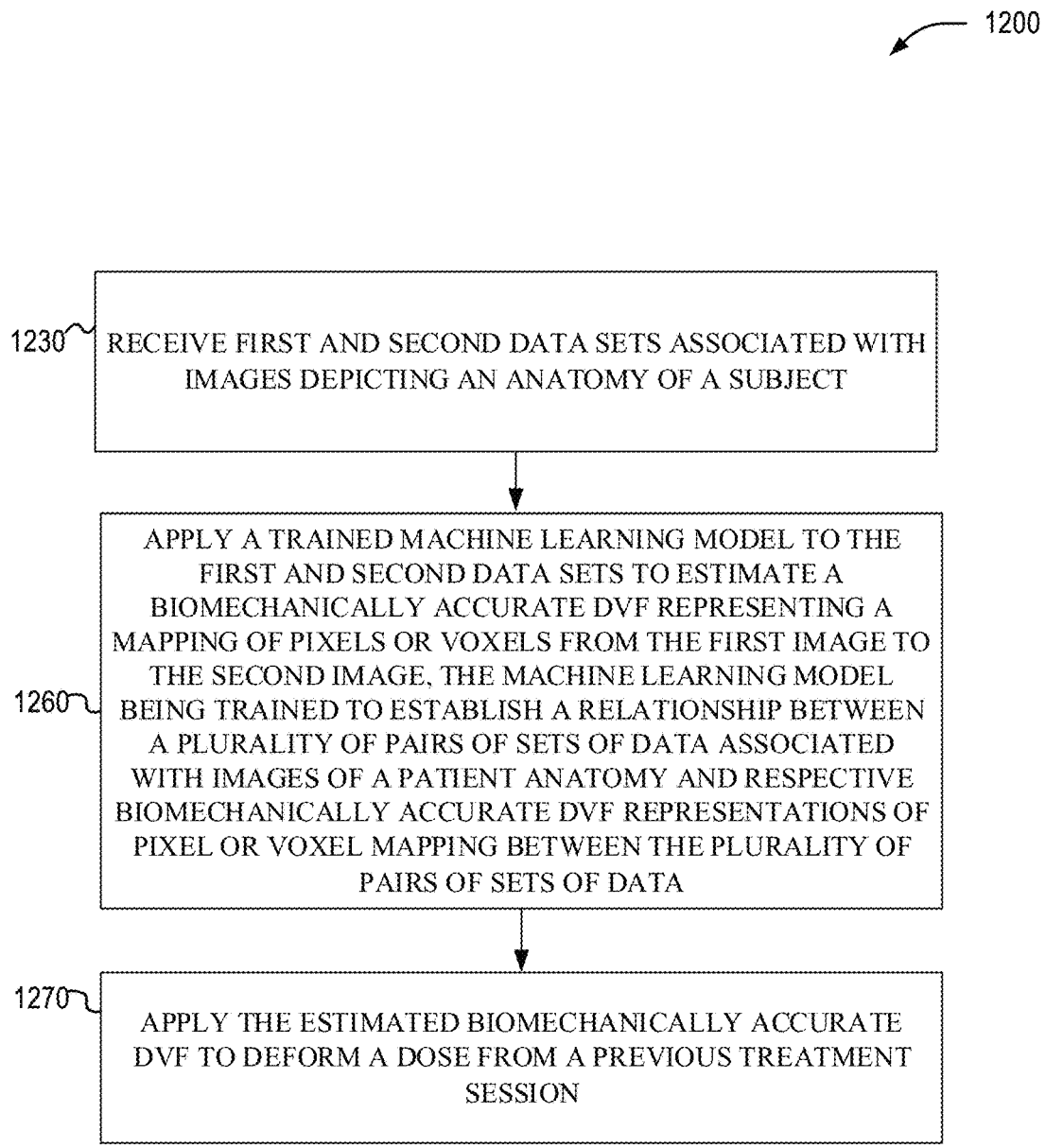
FIG. 12 illustrates a method for using trained deep learning to generate radiotherapy equipment parameters from a predicted DVF, according to some embodiments of the present disclosure.

FIG. 12 is a flowchart illustrating example operations of the image processing device 112 in performing process 1200, according to example embodiments. The process 1200 may be embodied in computer-readable instructions for execution by one or more processors such that the operations of the process 1200 may be performed in part or in whole by the functional components of the image processing device 112; accordingly, the process 1200 is described below by way of example with reference thereto. However, in other embodiments, at least some of the operations of the process 1200 may be deployed on various other hardware configurations. The process 1200 is therefore not intended to be limited to the image processing device 112 and can be implemented in whole, or in part, by any other component. Some or all of the operations of process 1200 can be in parallel, out of order, or entirely omitted.

At operation 1230, image processing device 112 receives first and second data sets associated respectively with first and second images depicting an anatomy of a subject.

At operation 1260, image processing device 112 applies a trained machine learning model to the first data set associated with the first image and the second data set associated with the second image to estimate a biomechanically accurate DVF representing a mapping of pixels or voxels from the first image to the second image. The machine learning model is trained to establish a relationship between a plurality of pairs of data sets associated with images of a patient anatomy and respective biomechanically accurate DVF representations of pixel or voxel mapping between the plurality of pairs of data sets.

At operation 1270, image processing device 112 applies the estimated biomechanically accurate DVF to deform a dose from a previous treatment session.

Figure 13:
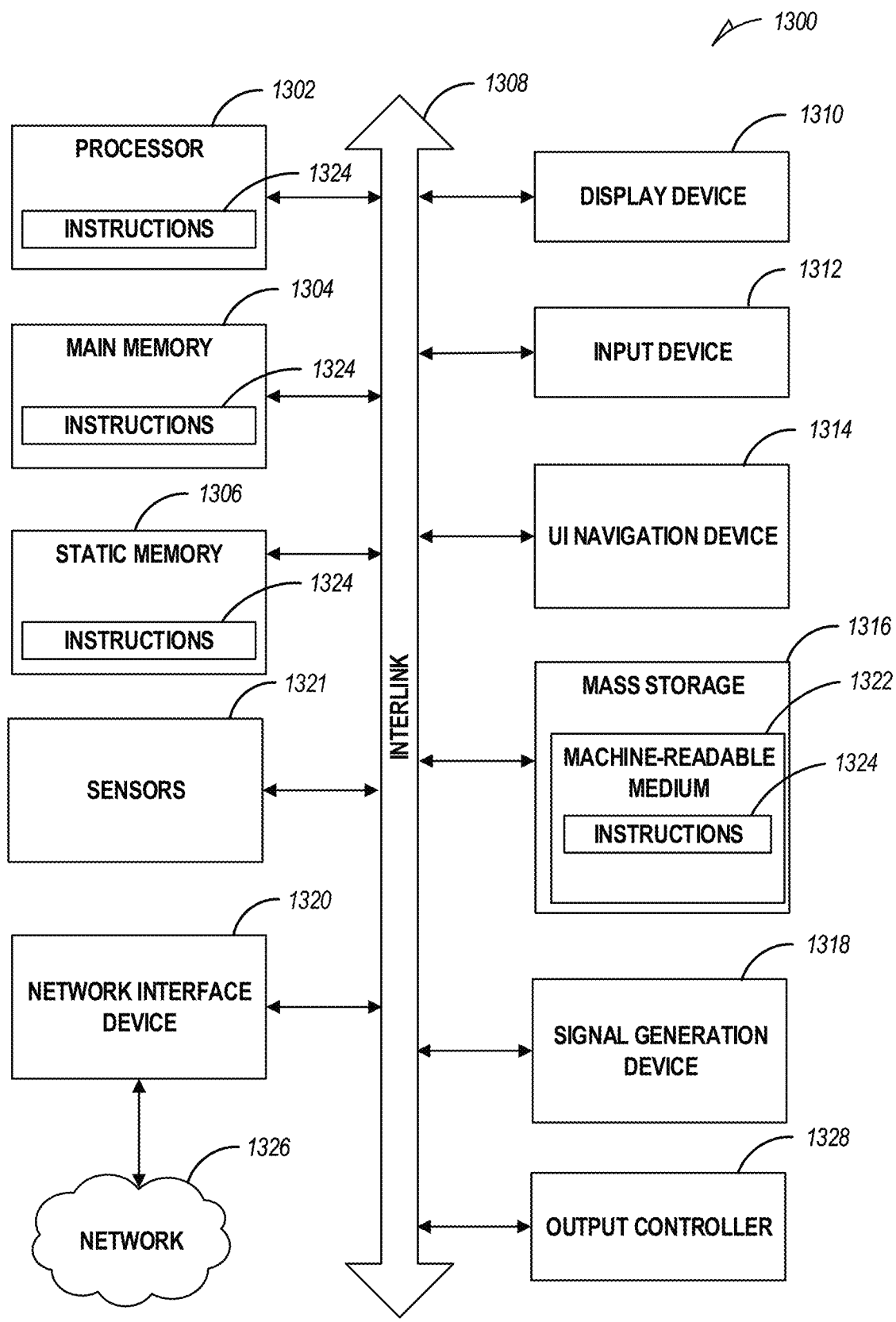
FIG. 13 illustrates an exemplary block diagram of a machine on which one or more of the methods as discussed herein can be implemented.

FIG. 13 illustrates a block diagram of an embodiment of a machine 1300 on which one or more of the methods as discussed herein can be implemented. In one or more embodiments, one or more items of the image processing device 112 can be implemented by the machine 1300. In alternative embodiments, the machine 1300 operates as a standalone device or may be connected (e.g., networked) to other machines. In one or more embodiments, the image processing device 112 can include one or more of the items of the machine 1300. In a networked deployment, the machine 1300 may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 1300 includes processing circuitry 1302 (e.g., a CPU, a graphics processing unit (GPU), an ASIC, circuitry, such as one or more transistors, resistors, capacitors, inductors, diodes, logic gates, multiplexers, buffers, modulators, demodulators, radios (e.g., transmit or receive radios or transceivers), sensors 1321 (e.g., a transducer that converts one form of energy (e.g., light, heat, electrical, mechanical, or other energy) to another form of energy), or the like, or a combination thereof), a main memory 1304 and a static memory 1306, which communicate with each other via a bus 1308. The machine 1300 (e.g., computer system) may further include a video display unit 1310 (e.g., a liquid crystal display (LCD) or a cathode ray tube (CRT)). The machine 1300 also includes an alphanumeric input device 1312 (e.g., a keyboard), a user interface (UI) navigation device 1314 (e.g., a mouse), a disk drive or mass storage unit 1316, a signal generation device 1318 (e.g., a speaker), and a network interface device 1320.

The disk drive or mass storage unit 1316 includes a machine-readable medium 1322 on which is stored one or more sets of instructions and data structures (e.g., software) 1324 embodying or utilized by any One or more of the methodologies or functions described herein. The instructions 1324 may also reside, completely or at least partially, within the main memory 1304 and/or within the processor 1302 during execution thereof by the machine 1300, the main memory 1304 and the processor 1302 also constituting machine-readable media.

The machine 1300 as illustrated includes an output controller 1328. The output controller 1328 manages data flow to/from the machine 1300. The output controller 1328 is sometimes called a device controller, with software that directly interacts with the output controller 1328 being called a device driver.

While the machine-readable medium 1322 is shown in an embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), EEPROM, and flash memory devices; magnetic disks such as internal hard disks and removable disks; magneto-optical disks; and CD-ROM and DVD-ROM disks.

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

As used herein, "communicatively coupled between" means that the entities on either of the coupling must communicate through an item therebetween and that those entities cannot communicate with each other without communicating through the item.

Additional Notes

The above detailed description includes references to the accompanying drawings, which form a part of the detailed description. The drawings show, by way of illustration but not by way of limitation, specific embodiments in which the disclosure can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a," "an," "the," and "said" are used when introducing elements of aspects of the disclosure or in the embodiments thereof, as is common in patent documents, to include one or more than one or more of the elements, independent of any other instances or usages of "at least one" or "one or more." In this document, the term "or" is used to refer to a nonexclusive or, such that "A or B" includes "A but not B," "B but not A," and "A and B," unless otherwise indicated.

In the appended claims, the terms "including" and "in which" are used as the plain-English equivalents of the respective terms "comprising" and "wherein." Also, in the following claims, the terms "comprising," "including," and "having" are intended to be open-ended to mean that there may be additional elements other than the listed elements, such that after such a term (e.g., comprising, including, having) in a claim are still deemed to fall within the scope of that claim. Moreover, in the following claims, the terms "first," "second," and "third," and so forth, are used merely as labels, and are not intended to impose numerical requirements on their objects.

Embodiments of the disclosure may be implemented with computer-executable instructions. The computer-executable instructions (e.g., software code) may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Method examples (e.g., operations and functions) described herein can be machine or computer-implemented at least in part (e.g., implemented as software code or instructions). Some examples can include a computer-readable medium or machine-readable medium encoded with instructions operable to configure an electronic device to perform methods as described in the above examples. An implementation of such methods can include software code, such as microcode, assembly language code, a higher-level language code, or the like (e.g., "source code"). Such software code can include computer readable instructions for performing various methods (e.g., "object" or "executable code"). The software code may form portions of computer program products. Software implementations of the embodiments described herein may be provided via an article of manufacture with the code or instructions stored thereon, or via a method of operating a communication interface to send data via a communication interface (e.g., wirelessly, over the interne, via satellite communications, and the like).

Further, the software code may be tangibly stored on one or more volatile or non-volatile computer-readable storage media during execution or at other times. These computer-readable storage media may include any mechanism that stores information in a form accessible by a machine (e.g., computing device, electronic system, and the like), such as, but are not limited to, floppy disks, hard disks, removable magnetic disks, any form of magnetic disk storage media, CD-ROMs, magnetic-optical disks, removable optical disks (e.g., compact disks and digital video disks), flash memory devices, magnetic cassettes, memory cards or sticks (e.g., secure digital cards), RAMs (e.g., CMOS RAM and the like), recordable/non-recordable media (e.g., read only memories (ROMs)), EPROMS, EEPROMS, or any type of media suitable for storing electronic instructions, and the like. Such computer readable storage medium coupled to a computer system bus to be accessible by the processor and other parts of the OIS.

In an embodiment, the computer-readable storage medium may have encoded a data structure for a treatment planning, wherein the treatment plan may be adaptive. The data structure for the computer-readable storage medium may be at least one of a Digital Imaging and Communications in Medicine (DICOM) format, an extended DICOM format, an XML format, and the like. DICOM is an international communications standard that defines the format used to transfer medical image-related data between various types of medical equipment. DICOM RT refers to the communication standards that are specific to radiation therapy.

In various embodiments of the disclosure, the method of creating a component or module can be implemented in software, hardware, or a combination thereof. The methods provided by various embodiments of the present disclosure, for example, can be implemented in software by using standard programming languages such as, for example, C, C++, Java, Python, and the like; and combinations thereof. As used herein, the terms "software" and "firmware" are interchangeable, and include any computer program stored in memory for execution by a computer.

A communication interface includes any mechanism that interfaces to any of a hardwired, wireless, optical, and the like, medium to communicate to another device, such as a memory bus interface, a processor bus interface, an Internet connection, a disk controller, and the like. The communication interface can be configured by providing configuration parameters and/or sending signals to prepare the communication interface to provide a data signal describing the software content. The communication interface can be accessed via one or more commands or signals sent to the communication interface.

The present disclosure also relates to a system for performing the operations herein. This system may be specially constructed for the required purposes, or it may comprise a general-purpose computer selectively activated or reconfigured by a computer program stored in the computer. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

In view of the above, it will be seen that the several objects of the disclosure are achieved, and other advantageous results attained. Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

The above description is intended to be illustrative, and not restrictive. For example, the above-described examples (or one or more aspects thereof) may be used in combination with each other. In addition, many modifications may be made to adapt a particular situation or material to the teachings of the disclosure without departing from its scope. While the dimensions, types of materials and coatings described herein are intended to define the parameters of the disclosure, they are by no means limiting and are exemplary embodiments. Many other embodiments will be apparent to those of skill in the art upon reviewing the above description. The scope of the disclosure should, therefore, be determined with reference to the appended claims, along with the full scope of equivalents to which such claims are entitled.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the disclosure should be determined with reference to the appended claims, along with the full scope of equivalents to which such claims are entitled. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

What is claimed is:

1. A method for generating a biomechanically accurate deformation vector field (DVF) for input images, the method comprising:
    receiving first and second images depicting an anatomy of a subject;
    applying a trained machine learning model to a first data set associated with the first image, the first data set excluding a first contour associated with the first image, and a second data set associated with the second image to estimate a biomechanically accurate DVF representing a mapping of pixels or voxels from the first image to the second image without processing the first contour of the first image, the machine learning model trained to establish a relationship between a plurality of pairs of data sets associated with images of a patient anatomy and respective biomechanically accurate DVF representations of pixel or voxel mapping between the plurality of pairs of data sets; and
    applying the estimated biomechanically accurate DVF to deform a dose from a previous treatment session.

2. The method of claim 1, wherein the machine learning model comprises a deep convolution neural network, wherein the first contour comprises data that is overlaid on top of the first image to delineate one or more structures in the first image, and wherein the second contour comprises data that is overlaid on top of the second image to delineate one or more structures in the second image.

3. The method of claim 1, further comprising training the machine learning model by adjusting one or more parameters of the machine learning model to minimize a cost function that includes a difference between a given one of the biomechanically accurate DVF representations and predicted biomechanically accurate DVF representations generated based on respective pairs of the plurality of pairs of images.

4. The method of claim 1, wherein the first data set associated with the first image includes a fixed image and the second data set associated with the second image includes a moving image, the second data set excluding a second contour associated with the second image, the biomechanically accurate DVF being estimated without processing the first and second contours of the first and second images.

5. The method of claim 1, wherein the first data set comprises at least one of one or more portions of the first image of the anatomy, and wherein the second data set comprises at least one of one or more portions of the second image.

6. The method of claim 5, further comprising applying a second machine learning model to the first set of contours and the second set of contours to estimate the DVF representing a mapping of pixels or voxels from the first image to the second image.

7. The method of claim 1, further comprising:
    segmenting the first image to generate the first set of data comprising a first set of contours comprising the first contour;
    segmenting the second image to generate the second set of data comprising a second set of contours comprising a second contour; and
    applying the trained machine learning model to the first image, the first set of contours, the second image and the second set of contours to estimate a biomechanically accurate DVF representing a mapping of pixels or voxels from the first image to the second image.

8. The method of claim 1, wherein the biomechanically accurate DVF maintains biomechanical properties of tissues depicted in the first and second images.

9. The method of claim 1, wherein the first image comprises a computed tomography (CT) image, a synthetic CT image, a magnetic resonance (MR) image, a synthetic MR image, an ultrasound image, or a synthetic ultrasound image, and wherein the second images comprises an MR image.

10. The method of claim 1, further comprising:
    generating a set of training data comprising the biomechanically accurate DVF representations of pixel or voxel mapping between the plurality of pairs of data sets associated with the images, the generating of the set of training data comprising:
    receiving a first pair of data sets associated with the images of the plurality of pairs of data sets associated with the images; and
    applying a biomechanical deformable image registration (BDIR) technique to the first pair of data sets to generate a first biomechanically accurate DVF representation.

11. The method of claim 10, further comprising training the machine learning model by:
    obtaining the first pair of data sets and the first biomechanically accurate DVF representation;
    applying the machine learning model to the first pair of data sets to generate a first estimated biomechanically accurate DVF representation;
    computing a deviation between the first estimated biomechanically accurate DVF representation and the first biomechanically accurate DVF representation; and
    adjusting one or more parameters of the machine learning model based on the computed deviation.

12. A method of training a machine leaning model to estimate a biomechanically accurate deformation vector field (DVF) representation, the method comprising:
    obtaining a first data set associated with a first pair of images of a patient anatomy, the first data set excluding contours of the first pair of images;
    obtaining a ground-truth biomechanically accurate DVF representation for the first data set associated with the first pair of images;
    applying a machine learning model to the first data set to generate a first estimated biomechanically accurate DVF representation without processing the contours of the first pair of images;
    computing a deviation between the first estimated biomechanically accurate DVF representation and the ground-truth biomechanically accurate DVF representation for the first data set; and
    adjusting one or more parameters of the machine learning model based on the computed deviation.

13. The method of claim 12, further comprising:
obtaining a plurality of pairs of data sets associated with images of the patient anatomy;
obtaining a plurality of ground-truth biomechanically accurate DVF representations associated with respective ones of the plurality of pairs of data sets associated with the images; and
for each of the plurality of pairs of data sets:
applying the machine learning model to the respective pair of data sets to generate a respective estimated biomechanically accurate DVF representation;
computing a deviation between the respective estimated biomechanically accurate DVF representation and the ground-truth biomechanically accurate DVF representation associated with the respective one of the pair of data sets; and
adjusting one or more parameters of the machine learning model based on the computed deviation.

14. The method of claim 12, further comprising:
receiving the first data set associated with the first pair of images of the patient anatomy; and
applying a biomechanical deformable image registration (BDIR) technique to the first data set to generate the ground-truth biomechanically accurate DVF representation for the first data set.

15. A system comprising:
one or more processors for performing operations comprising:
receiving first and second data sets associated respectively with first and second images depicting an anatomy of a subject;
applying a trained machine learning model to a first data set associated with the first image, the first data set excluding a first contour associated with the first image, and a second data set associated with the second image to estimate a biomechanically accurate DVF representing a mapping of pixels or voxels from the first image to the second image without processing the first contour of the first image, the machine learning model trained to establish a relationship between a plurality of pairs of data sets associated with images of a patient anatomy and respective biomechanically accurate DVF representations of pixel or voxel mapping between the plurality of pairs of data sets; and
applying the estimated biomechanically accurate DVF to deform a dose from a previous treatment session.

16. The system of claim 15, wherein the machine learning model comprises a deep convolution neural network.

17. The system of claim 15, wherein the operations further comprise training the machine learning model by adjusting one or more parameters of the machine learning model to minimize a cost function that includes a difference between a given one of the biomechanically accurate DVF representations and predicted biomechanically accurate DVF representations generated based on respective pairs of the plurality of pairs of data sets.

18. The system of claim 15, wherein the first data set associated with the first image includes a fixed image and the second data set associated with the second image includes a moving image.

19. The system of claim 15, wherein the first data set comprises at least one of one or more portions of the first image of the anatomy, and wherein the second data set comprises at least one of one or more portions of the second image.

20. The system of claim 19, wherein the operations further comprise applying a second machine learning model to the first set of contours and the second set of contours to estimate the DVF representing a mapping of pixels or voxels from the first image to the second image.

21. The system of claim 15, wherein the operations further comprise:
segmenting the first image to generate the first set of data comprising a first set of contours comprising the first contour;
segmenting the second image to generate the second set of data comprising a second set of contours comprising a second contour; and
applying the trained machine learning model to the first image, the first set of contours, the second image and the second set of contours to estimate a biomechanically accurate DVF representing a mapping of pixels or voxels from the first image to the second image, the machine learning model being trained to establish a relationship between a plurality of pairs of data sets associated with images of a patient anatomy with corresponding sets of contours and respective biomechanically accurate DVF representations of pixel or voxel mapping between the plurality of pairs of data sets and corresponding sets of contours.

22. The system of claim 15, wherein the operations further comprise:
generating a set of training data comprising the biomechanically accurate DVF representations of pixel or voxel mapping between the plurality of pairs of data sets associated with the images, the generating of the set of training data comprising:
receiving a first pair of data sets of the plurality of pairs of data sets; and
applying a biomechanical deformable image registration (BDIR) technique to the first pair of data sets to generate a first biomechanically accurate DVF representation.

23. The system of claim 22, wherein the operations further comprise training the machine learning model by:
obtaining the first pair of data sets and the first biomechanically accurate DVF representation;
applying the machine learning model to the first pair of data sets to generate a first estimated biomechanically accurate DVF representation;
computing a deviation between the first estimated biomechanically accurate DVF representation and the first biomechanically accurate DVF representation; and
adjusting one or more parameters of the machine learning model based on the computed deviation.

24. A non-transitory machine-readable storage medium that includes instructions that, when executed by one or more processors of a machine, cause the machine to perform operations comprising:
receiving first and second data sets associated respectively with first and second images depicting an anatomy of a subject;
applying a trained machine learning model to a first data set associated with the first image, the first data set excluding a first contour associated with the first image, and a second data set associated with the second image to estimate a biomechanically accurate DVF representing a mapping of pixels or voxels from the first image to the second image without processing the first contour of the first image, the machine learning model trained to establish a relationship between a plurality of pairs of data sets associated with images of a patient anatomy and respective biomechanically accurate DVF representations of pixel or voxel mapping between the plurality of pairs of data sets; and applying the estimated biomechanically accurate DVF to deform a dose from a previous treatment session.

25. A non-transitory machine-readable storage medium that includes instructions that, when executed by one or more processors of a machine, cause the machine to perform operations comprising:

obtaining a first data set associated with a first pair of images of a patient anatomy, the first data set excluding contours of the first pair of images;

obtaining a ground-truth biomechanically accurate DVF representation for the first data set associated with the first pair of images;

applying a machine learning model to the first data set to generate a first estimated biomechanically accurate DVF representation without processing the contours of the first pair of images;

computing a deviation between the first estimated biomechanically accurate DVF representation and the ground-truth biomechanically accurate DVF representation for the first data set; and adjusting one or more parameters of the machine learning model based on the computed deviation.

* * * * *

UNITED STATES PATENT AND TRADEMARK OFFICE
CERTIFICATE OF CORRECTION

PATENT NO. : 11,989,851 B2
APPLICATION NO. : 17/303007
DATED : May 21, 2024
INVENTOR(S) : Virgil Matthew Willcut Page 1 of 1

It is certified that error appears in the above-identified patent and that said Letters Patent is hereby corrected as shown below:

In the Claims

In Column 35, Line 8, in Claim 13, delete "sets:" and insert --sets;-- therefor

Signed and Sealed this
Fifth Day of August, 2025

Coke Morgan Stewart
*Acting Director of the United States Patent and Trademark Office*